US011638176B2

United States Patent
Gulati et al.

(10) Patent No.: US 11,638,176 B2
(45) Date of Patent: Apr. 25, 2023

(54) TECHNIQUES FOR CONTROLLING ADMISSION FOR SIDELINK COMMUNICATIONS

(71) Applicant: QUALCOMM Incorporated, San Diego, CA (US)

(72) Inventors: Kapil Gulati, Hillsborough, NJ (US); Zhibin Wu, Los Altos, CA (US); Hong Cheng, Bridgewater, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 16/918,899

(22) Filed: Jul. 1, 2020

(65) Prior Publication Data

US 2021/0037420 A1 Feb. 4, 2021

Related U.S. Application Data

(60) Provisional application No. 62/879,650, filed on Jul. 29, 2019.

(51) Int. Cl.
*H04W 28/08* (2009.01)
*H04W 4/46* (2018.01)
(Continued)

(52) U.S. Cl.
CPC ......... *H04W 28/0875* (2020.05); *H04W 4/46* (2018.02); *H04W 28/0268* (2013.01);
(Continued)

(58) Field of Classification Search
None
See application file for complete search history.

(56) References Cited

U.S. PATENT DOCUMENTS

| 10,171,159 B1* | 1/2019 | Tailor ...................... H04L 5/006 |
| 2021/0135789 A1* | 5/2021 | Wu ......................... H04L 27/261 |
| 2021/0410129 A1* | 12/2021 | Freda ..................... H04W 76/14 |

FOREIGN PATENT DOCUMENTS

| WO | WO-2015178814 A1 | 11/2015 |
| WO | WO-2017117424 A1 | 7/2017 |

OTHER PUBLICATIONS

International Search Report and Written Opinion—PCT/US2020/040620—ISA/EPO—dated Nov. 25, 2020.
(Continued)

*Primary Examiner* — Mohammad S Adhami
(74) *Attorney, Agent, or Firm* — Dalei Dong; Holland & Hart LLP

(57) ABSTRACT

Methods, systems, and devices for wireless communications are described in which two or more UEs of a wireless communications system may establish a sidelink connection. A first UE that is initiating sidelink communications may evaluate whether the sidelink connection can support a quality of service (QoS) for a data flow prior to admitting the data flow. The first UE may evaluate a link quality with one or more other UEs that are to use the data flow on the sidelink connection, evaluate system congestion of time/frequency resources that are available for the sidelink connection, or any combinations thereof, and admit the data flow based on the evaluation. A link quality of the sidelink connection may be determined based on a type of communication associated with the data flow, such as unicast communications with one other UE, multicast communications with multiple other UEs, or broadcast transmissions to multiple UEs.

20 Claims, 19 Drawing Sheets

(51) Int. Cl.
*H04W 28/02* (2009.01)
*H04W 72/02* (2009.01)
*H04W 72/08* (2009.01)
*H04W 92/18* (2009.01)

(52) U.S. Cl.
CPC ... *H04W 28/0273* (2013.01); *H04W 28/0967* (2020.05); *H04W 72/02* (2013.01); *H04W 72/085* (2013.01); *H04W 92/18* (2013.01)

(56) References Cited

OTHER PUBLICATIONS

Ericsson: "On NR Sidelink Admission Control", 3GPP Draft, R2-1901704, On NR Sidelink Admission Control, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 14, 2019 (Feb. 14, 2019), XP051603056, 3 Pages, Retrieved from the Internet: URL:http://www.3gpp.org/ftp/tsg%5Fran/WG2%5FRL2/TSGR2%5F105/Docs/R2%2D1901704%2Ezip [retrieved on Feb. 14, 2019].

Huawei (Rapporteur): "Summary of Email Discussion [104#58] [NR V2X]—QoS Support for NR V2X", 3GPP Draft, R2-1900370, Summary of Email Discussion [104#58] [NR V2X]—QoS Support for NR V2X, 3rd Generation Partnership Project (3GPP), Mobile Competence Centre, 650, Route Des Lucioles, F-06921 SO, vol. RAN WG2, No. Athens, Greece, Feb. 25, 2019-Mar. 1, 2019, Feb. 15, 2019 (Feb. 15, 2019), XP051601766, 57 Pages, Retrieved from the Internet: URL:http://www.3gpp.org/ftp/tsg%5Fran/WG2%5FRL2/TSGR2%5F105/Docs/R2%2D1900370%2Ezip [retrieved on Feb. 15, 2019] pp. 1-4, pp. 24, 25, pp. 37-43.

Interdigital Inc: "QoS Management for NR V2X", 3GPP Draft, R2-1901575 (R16 V2X SI A1145 QoS Management for NR V2X), 3rd Generation Partnership Project (3GPP), Mobile Competence Centre, 650, Route Des Lucioles, F-06921 Sophia-Antipolis Cedex, FR, vol. RAN WG2, No. Athens, Greece, Feb. 25, 2019-Mar. 1, 2019, Feb. 15, 2019 (Feb. 15, 2019), XP051602930, 4 Pages, Retrieved from the Internet: URL:http://www.3gpp.org/ftp/tsg%5Fran/WG2%5FRL2/TSGR2%5F105/Docs/R2%2D1901575%2Ezip [retrieved on Feb. 15, 2019].

Interdigital Inc: "QoS Management for NR V2X", 3GPP Draft, R2-1904218 (R16 V2X WI A1145 QoS Management for NR V2X), 3rd Generation Partnership Project (3GPP), Mobile Competence Centre, 650, Route Des Lucioles, F-06921 Sophia-Antipolis Cedex, FR, vol. RAN WG2, No. Xi'an, China, Apr. 8, 2019-Apr. 12, 2019, Apr. 6, 2019 (Apr. 6, 2019), XP051701530, 4 Pages, Retrieved from the Internet: URL:http://www.3gpp.org/ftp/Meetings%5F3GPP%5FSYNC/RAN2/Docs/R2%2D1904218%2Ezip [retrieved on Apr. 6, 2019].

Partial International Search Report—PCT/US2020/040620—ISA/EPO—dated Oct. 1, 2020.

* cited by examiner

TECHNIQUES FOR CONTROLLING ADMISSION FOR SIDELINK COMMUNICATIONS

CROSS REFERENCE

The present application for patent claims the benefit of U.S. Provisional Patent Application No. 62/879,650 by GULATI et al., entitled "TECHNIQUES FOR CONTROLLING ADMISSION FOR SIDELINK COMMUNICATIONS," filed Jul. 29, 2019, assigned to the assignee hereof, and expressly incorporated by reference herein.

FIELD OF THE DISCLOSURE

The following relates generally to wireless communications, and more specifically to techniques for controlling admission for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or a both. A sidelink is a communication link between similar devices. For example, a sidelink may support communications between multiple UEs or may support communications between multiple base stations. In some examples, a PC5 interface may support sidelink communications (e.g., supporting vehicle-to-everything (V2X) and/or vehicle-to-vehicle (V2V) communications between vehicles in a system). In some cases, a sidelink may be referred to as a device-to-device (D2D) link and may support unicast messaging, multicast messaging, broadcast messaging, or combinations thereof. With the addition of one or more communications links at a wireless device, link management at a device may become challenging. Accordingly, efficient techniques for link management of sidelink communication links may be desirable.

SUMMARY

The described techniques relate to improved methods, systems, devices, and apparatuses that support admission control for sidelink communications. In various aspects, the described techniques provide for a first user equipment (UE), such as a UE that is initiating a sidelink connection, that evaluates whether a link can support quality of service (QoS) for a new data flow prior to admitting the new flow. In some cases, the first UE may evaluate a link quality with one or more other UEs that are to use the data flow on a sidelink connection, evaluate system congestion of time/frequency resources that are available for the sidelink connection, or any combinations thereof. In some cases, link quality of the sidelink connection may be determined based on a type of communication associated with the data flow, such as unicast communications with one other UE (e.g., a second UE or a receiving UE), multicast communications with multiple other UEs, or broadcast transmissions to multiple UEs.

In some cases, for unicast or multicast communications that use channel quality information (CQI) feedback, the first UE may transmit a reference signal (e.g., a channel state information reference signal (CSI-RS)) and receive one or more measurement reports from one or more other UEs, and determine whether the link quality based on the measurement report(s) can support the QoS of the data flow. In some cases, multicast communications of the first UE may not be based on CQI feedback, and the first UE may evaluate link quality by transmitting a test signal using transmission parameters that would be associated with the data flow, and monitoring for negative acknowledgment (NACK) feedback from one or more UEs associated with the test signal. The first UE in such cases may admit the data flow when fewer than a threshold number of NACKs are received (e.g., based on a predetermined number of NACKs during a specified time period). In cases where the first UE uses broadcast transmissions to multiple UEs, channel quality may be determined based on whether the first UE has access to sufficient transmission resources to meet a throughput of the data flow.

In some cases, additionally or alternatively, the first UE may admit the new data flow based on system congestion or system resource availability. In such cases, the first UE may determine channel resource requirements for the data flow based at least in part on an amount of resources required to provide the QoS associated with the data flow, a data rate of the data flow, a priority of the data flow, an anticipated number of retransmissions associated with the data flow, or any combinations thereof. In some cases, the first UE may determine other resource commitments (e.g., based on one or more other flows that are to be maintained with a base station or one or more other sidelink UEs), a channel busy ratio (CBR) associated with the wireless link that indicates channel congestion, or combinations thereof. In some cases, the first UE may determine the system congestion or system resource availability based on a mapping between a channel resource availability table and one or more of a priority of the data flow, the CBR associated with the link, or a packet delay budget (PDB) of the data flow. In other cases, the first UE may conduct a medium access control (MAC) layer pseudo-resource selection for the first data flow based on a number of different possible data arrival times, and determine whether transmission resources are available for more than a predetermined percentage of the number of different possible data arrival times.

A method of wireless communication is described. The method may include receiving an indication that a first data flow is to be initiated in a device-to-device sidelink connection between a first UE and at least a second UE, identifying a quality of service associated with the first data flow, determining that a first link between the first UE and at least the second UE can support the first data flow based on the quality of service associated with the first data flow and an available throughput of the first link, where the available throughput of the first link is based on multiplexing the first link with one or more other links of the first UE, and establishing the first data flow with at least the second UE based on the determination.

An apparatus for wireless communication is described. The apparatus may include a processor, memory coupled with the processor, and instructions stored in the memory. The instructions may be executable by the processor to cause the apparatus to receive an indication that a first data flow is to be initiated in a device-to-device sidelink connection between a first UE and a second UE, identify a quality of service associated with the first data flow, determine that a first link between the first UE and the second UE can support the first data flow based on the quality of service associated with the first data flow and an available throughput of the first link, where the available throughput of the first link is based on multiplexing the first link with one or more other links of the first UE, and establish the first data flow with the second UE based on the determination.

Another apparatus for wireless communication is described. The apparatus may include means for receiving an indication that a first data flow is to be initiated in a device-to-device sidelink connection between a first UE and a second UE, identifying a quality of service associated with the first data flow, determining that a first link between the first UE and the second UE can support the first data flow based on the quality of service associated with the first data flow and an available throughput of the first link, where the available throughput of the first link is based on multiplexing the first link with one or more other links of the first UE, and establishing the first data flow with the second UE based on the determination.

A non-transitory computer-readable medium storing code for wireless communication is described. The code may include instructions executable by a processor to receive an indication that a first data flow is to be initiated in a device-to-device sidelink connection between a first UE and a second UE, identify a quality of service associated with the first data flow, determine that a first link between the first UE and the second UE can support the first data flow based on the quality of service associated with the first data flow and an available throughput of the first link, where the available throughput of the first link is based on multiplexing the first link with one or more other links of the first UE, and establish the first data flow with the second UE based on the determination.

In some examples of the method, apparatuses, and non-transitory computer-readable medium described herein, the device-to-device sidelink connection may be a unicast connection between the first UE and the second UE, may be a connection-based multicast device-to-device sidelink connection between the first UE and a plurality of other UEs, or may be a broadcast device-to-device sidelink connection between the first UE and a plurality of other UEs. In some examples of the method, apparatuses, and non-transitory computer-readable medium described herein, the determining that the first link can support the first data flow further may include operations, features, means, or instructions for estimating the channel quality of the first link based on one or more of a channel quality index of the first link, a link spectral efficiency of the first link, a rank indicator of the first link, or a precoding matrix indicator of the first link. In some examples of the method, apparatuses, and non-transitory computer-readable medium described herein, the quality of service associated with the first data flow may be based on one or more of a priority of data to be transmitted using the first data flow, a minimum data rate associated with the first data flow, a packet delay budget associated with the first data flow, or reliability associated with the first data flow. Some examples of the method, apparatuses, and non-transitory computer-readable medium described herein may further include operations, features, means, or instructions for determining a system resource availability associated with the first link, and where the establishing the first data flow with the second UE may be further based on the system resource availability.

In some examples of the method, apparatuses, and non-transitory computer-readable medium described herein, the determining the system resource availability may include operations, features, means, or instructions for determining channel resource requirements for the first data flow based on one or more of an amount of resources required to provide the quality of service associated with the first data flow, a data rate associated with the first data flow, a priority of the first data flow, an anticipated number of retransmissions associated with the first data flow, or any combinations thereof, determining an average resource availability for transmissions of the first data flow based on a channel busy ratio associated with the first link, and determining that the average resource availability for transmission of the first data flow meets or exceeds channel resource requirements to meet the quality of service associated with the first data flow. In some examples of the method, apparatuses, and non-transitory computer-readable medium described herein, the determining that the first link can support the first data flow further may include operations, features, means, or instructions for transmitting a reference signal to the second UE, and receiving a measurement report from the second UE, and where the channel quality of the first link may be based on the measurement report.

In some examples of the method, apparatuses, and non-transitory computer-readable medium described herein, the measurement report indicates one or more of a channel quality index, a link spectral efficiency that can be supported by the first link, a rank indication of the first link, a precoding matrix index of the first link, or any combinations thereof. In some examples of the method, apparatuses, and non-transitory computer-readable medium described herein, the determining that the first link can support the first data flow further may include operations, features, means, or instructions for determining the available throughput of the first link based on multiplexing the first data flow with other scheduled communications of one or more of the first UE or the second UE.

In some examples of the method, apparatuses, and non-transitory computer-readable medium described herein, the determining that the first link can support the first data flow further may include operations, features, means, or instructions for determining a link quality assessment based on the channel quality of the first link and the scheduled communications of the first UE and the second UE, and determining that the first link can support the first data flow based on the link quality assessment and the quality of service of the first data flow. In some examples of the method, apparatuses, and non-transitory computer-readable medium described herein, the determining that the first link can support the first data flow further may include operations, features, means, or instructions for receiving a CSI report from the second UE and one or more of a time availability or peak throughput of the second UE, and determining that the first link can support the first data flow based on the CSI report, the time availability or peak throughput of the second UE, and one or more other data flows of the first UE that are to be multiplexed with the first data flow.

Some examples of the method, apparatuses, and non-transitory computer-readable medium described herein may further include operations, features, means, or instructions for transmitting the quality of service of the first data flow to the second UE, and receiving, from the second UE, an indication that the second UE can support the first data flow, and where the determining that the first link can support the first data flow may be further based on the indication that the second UE can support the first data flow.

Some examples of the method, apparatuses, and non-transitory computer-readable medium described herein may further include operations, features, means, or instructions for determining that the first link between the first UE and the second UE does not support the first data flow based on the quality of service associated with the first data flow and the available throughput of the first link, determining a reduced quality of service of the first data flow that is supportable by the first link, providing an indication of the reduced quality of service to an application associated with the first data flow, receiving a response from the application associated with the first data flow that indicates the first data flow is to be transmitted based on the reduced quality of service, and where the establishing the first data flow with the second UE is further based on the reduced quality of service.

A method of wireless communication is described. The method may include receiving, at a first UE, an indication that a first data flow is to be initiated in a multicast device-to-device sidelink connection between the first UE and a set of other UEs, where the first UE has a set of links that each correspond to a respective second UE of the set of other UEs, identifying a quality of service associated with the first data flow, determining a link quality for each of the set of links, each link quality determined based on a corresponding channel quality and available channel throughput associated with the corresponding link of the set of links, and establishing the first data flow with the set of other UEs based on at least a predetermined number of the set of links having a link quality that supports the quality of service associated with the first data flow.

An apparatus for wireless communication is described. The apparatus may include a processor, memory coupled with the processor, and instructions stored in the memory. The instructions may be executable by the processor to cause the apparatus to receive, at a first UE, an indication that a first data flow is to be initiated in a multicast device-to-device sidelink connection between the first UE and a set of other UEs, where the first UE has a set of links that each correspond to a respective second UE of the set of other UEs, identify a quality of service associated with the first data flow, determine a link quality for each of the set of links, each link quality determined based on a corresponding channel quality and available channel throughput associated with the corresponding link of the set of links, and establish the first data flow with the set of other UEs based on at least a predetermined number of the set of links having a link quality that supports the quality of service associated with the first data flow.

Another apparatus for wireless communication is described. The apparatus may include means for receiving, at a first UE, an indication that a first data flow is to be initiated in a multicast device-to-device sidelink connection between the first UE and a set of other UEs, where the first UE has a set of links that each correspond to a respective second UE of the set of other UEs, identifying a quality of service associated with the first data flow, determining a link quality for each of the set of links, each link quality determined based on a corresponding channel quality and available channel throughput associated with the corresponding link of the set of links, and establishing the first data flow with the set of other UEs based on at least a predetermined number of the set of links having a link quality that supports the quality of service associated with the first data flow.

A non-transitory computer-readable medium storing code for wireless communication is described. The code may include instructions executable by a processor to receive, at a first UE, an indication that a first data flow is to be initiated in a multicast device-to-device sidelink connection between the first UE and a set of other UEs, where the first UE has a set of links that each correspond to a respective second UE of the set of other UEs, identify a quality of service associated with the first data flow, determine a link quality for each of the set of links, each link quality determined based on a corresponding channel quality and available channel throughput associated with the corresponding link of the set of links, and establish the first data flow with the set of other UEs based on at least a predetermined number of the set of links having a link quality that supports the quality of service associated with the first data flow.

In some examples of the method, apparatuses, and non-transitory computer-readable medium described herein, the determining the link quality for each of the set of links further may include operations, features, means, or instructions for estimating the channel quality of each of the set of links based on one or more of a channel quality index, a link spectral efficiency, a rank indicator, or a precoding matrix indicator associated with each of the set of links. In some examples of the method, apparatuses, and non-transitory computer-readable medium described herein, the quality of service associated with the first data flow may be based on one or more of a priority of data to be transmitted using the first data flow, a minimum data rate associated with the first data flow, a packet delay budget associated with the first data flow, or reliability associated with the first data flow. Some examples of the method, apparatuses, and non-transitory computer-readable medium described herein may further include operations, features, means, or instructions for determining a channel congestion associated with each of the set of links, and where the link quality for each of the set of links may be further based on the channel congestion associated with each of the set of links.

In some examples of the method, apparatuses, and non-transitory computer-readable medium described herein, the determining the link quality for each of the set of links further may include operations, features, means, or instructions for transmitting a reference signal to each of the set of other UEs, and receiving a set of measurement reports from the set of other UEs, and where the link quality for each of the set of links may be determined based on the corresponding measurement report. In some examples of the method, apparatuses, and non-transitory computer-readable medium described herein, the establishing the first data flow with the set of other UEs may be based on an aggregation of the set of measurement reports. In some examples of the method, apparatuses, and non-transitory computer-readable medium described herein, the predetermined number of the set of links may be based on a predetermined percentage of the set of links that have a link quality that supports the quality of service associated with the first data flow. In some examples of the method, apparatuses, and non-transitory computer-readable medium described herein, the predetermined percentage may be based on the quality of service associated with the first data flow.

A method of wireless communication is described. The method may include receiving, at a first UE, an indication that a first data flow is to be initiated in a multicast device-to-device sidelink connection between the first UE and a set of other UEs, identifying a quality of service associated with the first data flow, transmitting a test communication to the set of other UEs based on the quality of service associated with the first data flow, monitoring for one or more negative acknowledgments from one or more of the set of other UEs, and transmitting the first data flow based on receiving fewer than a threshold number of negative acknowledgments associated with the test communication.

An apparatus for wireless communication is described. The apparatus may include a processor, memory coupled with the processor, and instructions stored in the memory. The instructions may be executable by the processor to cause the apparatus to receive, at a first UE, an indication that a first data flow is to be initiated in a multicast device-to-device sidelink connection between the first UE and a set of other UEs, identify a quality of service associated with the first data flow, transmit a test communication to the set of other UEs based on the quality of service associated with the first data flow, monitor for one or more negative acknowledgments from one or more of the set of other UEs, and transmit the first data flow based on receiving fewer than a threshold number of negative acknowledgments associated with the test communication.

Another apparatus for wireless communication is described. The apparatus may include means for receiving, at a first UE, an indication that a first data flow is to be initiated in a multicast device-to-device sidelink connection between the first UE and a set of other UEs, identifying a quality of service associated with the first data flow, transmitting a test communication to the set of other UEs based on the quality of service associated with the first data flow, monitoring for one or more negative acknowledgments from one or more of the set of other UEs, and transmitting the first data flow based on receiving fewer than a threshold number of negative acknowledgments associated with the test communication.

A non-transitory computer-readable medium storing code for wireless communication is described. The code may include instructions executable by a processor to receive, at a first UE, an indication that a first data flow is to be initiated in a multicast device-to-device sidelink connection between the first UE and a set of other UEs, identify a quality of service associated with the first data flow, transmit a test communication to the set of other UEs based on the quality of service associated with the first data flow, monitor for one or more negative acknowledgments from one or more of the set of other UEs, and transmit the first data flow based on receiving fewer than a threshold number of negative acknowledgments associated with the test communication.

In some examples of the method, apparatuses, and non-transitory computer-readable medium described herein, the transmitting the test communication further may include operations, features, means, or instructions for transmitting one or more of a predetermined PDSCH communication, a predetermined PDCCH communication, a predetermined RRC signal, or any combinations thereof.

In some examples of the method, apparatuses, and non-transitory computer-readable medium described herein, the transmitting the test communication may include operations, features, means, or instructions for determining a target spectral efficiency and resource utilization based on the quality of service associated with the first data flow, and transmitting the test communication according to the target spectral efficiency and resource utilization. In some examples of the method, apparatuses, and non-transitory computer-readable medium described herein, a feedback range associated with the negative acknowledgments corresponds to a same feedback range as the first data flow. In some examples of the method, apparatuses, and non-transitory computer-readable medium described herein, the threshold number of negative acknowledgments may be based on the quality of service associated with the first data flow.

Some examples of the method, apparatuses, and non-transitory computer-readable medium described herein may further include operations, features, means, or instructions for determining that the first flow is not admissible based on receiving a number of negative acknowledgments that is greater than or equal to the threshold number of negative acknowledgments, and discontinuing the monitoring and the transmitting the first data flow based on the determining that the first flow is not admissible.

A method of wireless communication is described. The method may include receiving, at a first UE, an indication that a first data flow is to be initiated in a broadcast device-to-device sidelink connection between the first UE and a set of other UEs, identifying a quality of service associated with the first data flow, determining that the first UE can support the first data flow based on the quality of service associated with the first data flow and an available throughput of broadcast transmissions based on multiplexing the first data flow with transmissions of one or more other data flows of the first UE, and transmitting broadcast communications of the first data flow based on the determining.

An apparatus for wireless communication is described. The apparatus may include a processor, memory coupled with the processor, and instructions stored in the memory. The instructions may be executable by the processor to cause the apparatus to receive, at a first UE, an indication that a first data flow is to be initiated in a broadcast device-to-device sidelink connection between the first UE and a set of other UEs, identify a quality of service associated with the first data flow, determine that the first UE can support the first data flow based on the quality of service associated with the first data flow and an available throughput of broadcast transmissions based on multiplexing the first data flow with transmissions of one or more other data flows of the first UE, and transmit broadcast communications of the first data flow based on the determining.

Another apparatus for wireless communication is described. The apparatus may include means for receiving, at a first UE, an indication that a first data flow is to be initiated in a broadcast device-to-device sidelink connection between the first UE and a set of other UEs, identifying a quality of service associated with the first data flow, determining that the first UE can support the first data flow based on the quality of service associated with the first data flow and an available throughput of broadcast transmissions based on multiplexing the first data flow with transmissions of one or more other data flows of the first UE, and transmitting broadcast communications of the first data flow based on the determining.

A non-transitory computer-readable medium storing code for wireless communication is described. The code may include instructions executable by a processor to receive, at a first UE, an indication that a first data flow is to be initiated in a broadcast device-to-device sidelink connection between the first UE and a set of other UEs, identify a quality of service associated with the first data flow, determine that the first UE can support the first data flow based on the quality of service associated with the first data flow and an available throughput of broadcast transmissions based on multiplexing the first data flow with transmissions of one or more other data flows of the first UE, and transmit broadcast communications of the first data flow based on the determining.

In some examples of the method, apparatuses, and non-transitory computer-readable medium described herein, the determining may be performed based on an absence of retransmissions of the broadcast communications. In some examples of the method, apparatuses, and non-transitory computer-readable medium described herein, the determining that the first UE can support the first data flow may include operations, features, means, or instructions for determining a first set of resources for transmission of the first data flow, determining a second set of resources allocated for one or more transmissions or receptions of the one or more other data flows of the first UE, and determining that the first set of resources can be multiplexed around the second set of resources.

In some examples of the method, apparatuses, and non-transitory computer-readable medium described herein, the determining that the first UE can support the first data flow further may include operations, features, means, or instructions for determining, prior to determining that the first set of resources can be multiplexed around the second set of resources, that the first set of resources cannot be multiplexed around the second set of resources and maintain the quality of service, and discontinuing, prior to determining that the first set of resources can be multiplexed around the second set of resources, the determining that the first UE can support the first data flow. In some examples of the method, apparatuses, and non-transitory computer-readable medium described herein, the quality of service associated with the first data flow may be based on one or more of a priority of data to be transmitted using the first data flow, a minimum data rate associated with the first data flow, a packet delay budget associated with the first data flow, or reliability associated with the first data flow. Some examples of the method, apparatuses, and non-transitory computer-readable medium described herein may further include operations, features, means, or instructions for determining a channel congestion associated with a wireless channel that is to be used for transmitting the broadcast communications, and where the transmitting the broadcast communications of the first data flow may be further based on the channel congestion associated with the wireless channel. In some examples of the method, apparatuses, and non-transitory computer-readable medium described herein, the determining the channel congestion may include operations, features, means, or instructions for determining a channel busy ratio associated with the wireless channel.

A method of wireless communication is described. The method may include receiving, at a first UE, an indication that a first data flow is to be initiated in a device-to-device sidelink connection between the first UE and at least a second UE, identifying a quality of service associated with the first data flow, determining channel resource requirements for the first data flow based on one or more of an amount of resources required to provide the quality of service associated with the first data flow, a data rate of the first data flow, a priority of the first data flow, an anticipated number of retransmissions associated with the first data flow, or any combinations thereof, determining an average resource availability for transmissions of the first data flow based on a channel busy ratio associated with a first link between the first UE and at least the second UE, and establishing the first data flow with the second UE based on the average resource availability being sufficient to meet the channel resource requirements.

An apparatus for wireless communication is described. The apparatus may include a processor, memory coupled with the processor, and instructions stored in the memory. The instructions may be executable by the processor to cause the apparatus to receive, at a first UE, an indication that a first data flow is to be initiated in a device-to-device sidelink connection between the first UE and at least a second UE, identify a quality of service associated with the first data flow, determine channel resource requirements for the first data flow based on one or more of an amount of resources required to provide the quality of service associated with the first data flow, a data rate of the first data flow, a priority of the first data flow, an anticipated number of retransmissions associated with the first data flow, or any combinations thereof, determine an average resource availability for transmissions of the first data flow based on a channel busy ratio associated with a first link between the first UE and at least the second UE, and establish the first data flow with the second UE based on the average resource availability being sufficient to meet the channel resource requirements.

Another apparatus for wireless communication is described. The apparatus may include means for receiving, at a first UE, an indication that a first data flow is to be initiated in a device-to-device sidelink connection between the first UE and at least a second UE, identifying a quality of service associated with the first data flow, determining channel resource requirements for the first data flow based on one or more of an amount of resources required to provide the quality of service associated with the first data flow, a data rate of the first data flow, a priority of the first data flow, an anticipated number of retransmissions associated with the first data flow, or any combinations thereof, determining an average resource availability for transmissions of the first data flow based on a channel busy ratio associated with a first link between the first UE and at least the second UE, and establishing the first data flow with the second UE based on the average resource availability being sufficient to meet the channel resource requirements.

A non-transitory computer-readable medium storing code for wireless communication is described. The code may include instructions executable by a processor to receive, at a first UE, an indication that a first data flow is to be initiated in a device-to-device sidelink connection between the first UE and at least a second UE, identify a quality of service associated with the first data flow, determine channel resource requirements for the first data flow based on one or more of an amount of resources required to provide the quality of service associated with the first data flow, a data rate of the first data flow, a priority of the first data flow, an anticipated number of retransmissions associated with the first data flow, or any combinations thereof, determine an average resource availability for transmissions of the first data flow based on a channel busy ratio associated with a first link between the first UE and at least the second UE, and establish the first data flow with the second UE based on the average resource availability being sufficient to meet the channel resource requirements.

In some examples of the method, apparatuses, and non-transitory computer-readable medium described herein, the average resource availability may be further determined based on one or more of a channel quality of the first link, one or more other links that may be multiplexed on the first link, a radio resource control configuration of the first link, the priority of the first data flow, or any combinations thereof. In some examples of the method, apparatuses, and non-transitory computer-readable medium described herein, the average resource availability may be determined based on a mapping between a channel resource availability table and one or more of the priority of the first data flow or the channel busy ratio associated with the first link.

In some examples of the method, apparatuses, and non-transitory computer-readable medium described herein, the channel resource availability table indicates, for a set channel resource requirements, whether resources are available or not for a set of combinations of priorities of data flows and channel busy ratios. In some examples of the method, apparatuses, and non-transitory computer-readable medium described herein, the channel resource availability table may be periodically updated based on channel busy ratio measurements of the first UE.

In some examples of the method, apparatuses, and non-transitory computer-readable medium described herein, the channel resource availability table may be further mapped to packet delay budgets associated with the first data flow, and indicates whether resources are available or not for a set of combinations of priorities of data flows, channel busy ratios, and packet delay budgets. In some examples of the method, apparatuses, and non-transitory computer-readable medium described herein, the average resource availability may be determined based on a likelihood of first link resource availability at two or more possible data arrival times of the first data flow.

In some examples of the method, apparatuses, and non-transitory computer-readable medium described herein, the likelihood of first link resource availability at the two or more possible data arrival times may be determined based on a medium access control (MAC) layer pseudo-resource selection for the first data flow based on the two or more possible data arrival times. In some examples of the method, apparatuses, and non-transitory computer-readable medium described herein, the MAC layer pseudo-resource selection may be used to evaluate multiple data arrival times within a resource reservation interval and determine, for each of the multiple data arrival times whether resources for the first data flow are available or unavailable. In some examples of the method, apparatuses, and non-transitory computer-readable medium described herein, the first UE determines that the average resource availability are sufficient to meet the channel resource requirements based on a percentage of the multiple data arrival times that have available resources for the first data flow exceeding a threshold percentage value.

A method of wireless communication is described. The method may include receiving, at a second UE, an indication from a first UE that a first data flow is to be initiated in a device-to-device sidelink connection between the first UE and the second UE, determining a channel quality of a first link between the first UE and the second UE, transmitting a report to the first UE that indicates the channel quality of the first link and a schedule of the second UE, and receiving signaling from the first UE to establish the first data flow with the first UE.

An apparatus for wireless communication is described. The apparatus may include a processor, memory coupled with the processor, and instructions stored in the memory. The instructions may be executable by the processor to cause the apparatus to receive, at a second UE, an indication from a first UE that a first data flow is to be initiated in a device-to-device sidelink connection between the first UE and the second UE, determine a channel quality of a first link between the first UE and the second UE, transmit a report to the first UE that indicates the channel quality of the first link and a schedule of the second UE, and receive signaling from the first UE to establish the first data flow with the first UE.

Another apparatus for wireless communication is described. The apparatus may include means for receiving, at a second UE, an indication from a first UE that a first data flow is to be initiated in a device-to-device sidelink connection between the first UE and the second UE, determining a channel quality of a first link between the first UE and the second UE, transmitting a report to the first UE that indicates the channel quality of the first link and a schedule of the second UE, and receiving signaling from the first UE to establish the first data flow with the first UE.

A non-transitory computer-readable medium storing code for wireless communication is described. The code may include instructions executable by a processor to receive, at a second UE, an indication from a first UE that a first data flow is to be initiated in a device-to-device sidelink connection between the first UE and the second UE, determine a channel quality of a first link between the first UE and the second UE, transmit a report to the first UE that indicates the channel quality of the first link and a schedule of the second UE, and receive signaling from the first UE to establish the first data flow with the first UE.

Some examples of the method, apparatuses, and non-transitory computer-readable medium described herein may further include operations, features, means, or instructions for determining that the second UE can support the first data flow on the first link based on a quality of service associated with the first data flow, the channel quality of the first link, and an available throughput of the first link based on multiplexing the first link with one or more other links of the second UE. In some examples of the method, apparatuses, and non-transitory computer-readable medium described herein, the report to the first UE includes one or more of a channel quality index of the first link, a link spectral efficiency of the first link, a rank indicator of the first link, or a precoding matrix indicator of the first link. Some examples of the method, apparatuses, and non-transitory computer-readable medium described herein may further include operations, features, means, or instructions for transmitting a reference signal to the first UE, receiving a CSI report from the first UE and one or more of a time availability or peak throughput of the first UE, determining that the first link can support the first data flow based on the CSI report, the time availability or peak throughput of the first UE, and one or more other data flows of the second UE that are to be multiplexed with the first data flow, and transmitting an indication to the first UE that the second UE can support the first data flow via the first link. In some examples of the method, apparatuses, and non-transitory computer-readable medium described herein, the device-to-device sidelink connection between the first UE and the second UE is a unicast sidelink connection, or a connection-based multicast connection in which the first UE transmits the first data flow to a set of UEs that include the second UE.

DETAILED DESCRIPTION

Figure 1:
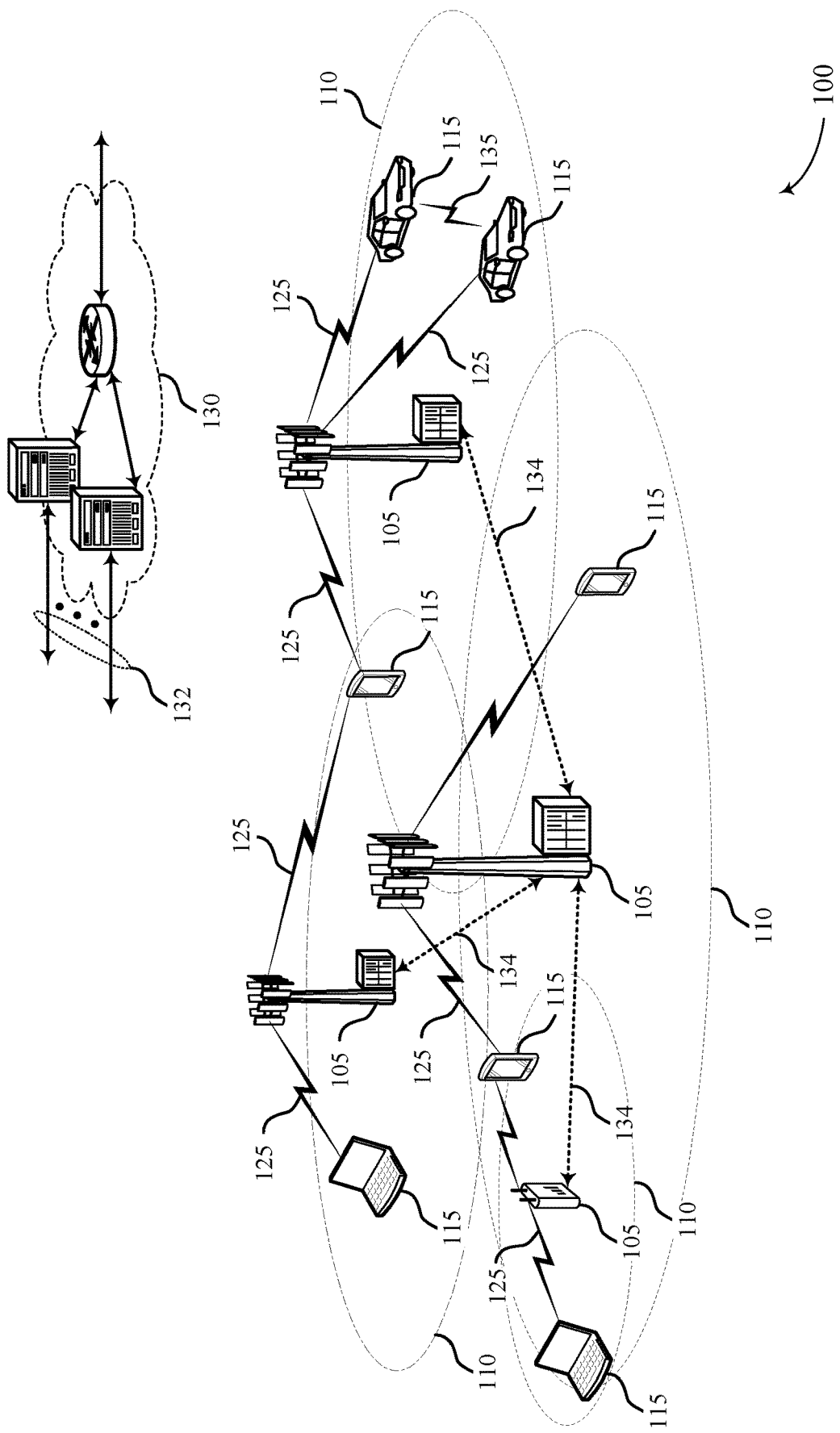
FIG. 1 illustrates an example of a system for wireless communications that supports techniques for controlling admission for sidelink communications in accordance with aspects of the present disclosure.

A wireless communications system may support both access links and sidelinks for communications between wireless devices. An access link may refer to any communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs.

Various sidelink connections between sidelink devices thus may be used to support data flows between the devices. In some cases, prior to admitting a data flow, admission control techniques may be used to determine whether or not quality of service (QoS) targets of the new data flow can be met. For example, data packets from multiple applications at a UE may be multiplexed into one data flow (which may be referred to as a QoS flow) based on QoS mapping rules, and each QoS flow may be associated with certain QoS requirements. Such QoS requirements may include, for example, data priority, packet delay budget (PDB), reliability or packet error rate, guaranteed bitrate (GBR), and the like. Based on the QoS requirements, an initiating UE may determine physical layer transmission parameters needed to meet the QoS requirements.

According to various techniques as discussed herein, a first UE that is initiating sidelink communications may evaluate whether the link can support the QoS for a data flow prior to admitting the new flow. In some cases, the first UE may evaluate a link quality with one or more other UEs that are to use the data flow on a sidelink connection, evaluate system congestion of time/frequency resources that are available for the sidelink connection, or any combinations thereof, and admit the data flow based on the evaluation. In some cases, link quality of the sidelink connection may be determined based on a type of communication associated with the data flow, such as unicast communications with one other UE (e.g., a second UE or a receiving UE), multicast communications with multiple other UEs, or broadcast transmissions to multiple UEs.

In some cases, for unicast or multicast communications that use channel quality information (CQI) feedback, the first UE may transmit a reference signal (e.g., a channel state information reference signal (CSI-RS)) and receive one or more measurement reports from one or more other UEs, and determine whether the link quality based on the measurement report(s) can support the QoS of the data flow. In some cases, multicast communications of the first UE may not be based on CQI feedback, and the first UE may evaluate link quality by transmitting a test signal using transmission parameters that would be associated with the data flow, and monitoring for negative acknowledgment (NACK) feedback from one or more UEs associated with the test signal. The first UE in such cases may admit the data flow when fewer than a threshold number of NACKs are received (e.g., based on a predetermined number of NACKs during a specified time period). In cases where the first UE uses broadcast transmissions to multiple UEs, channel quality may be determined based on whether the first UE has access to sufficient transmission resources to meet a throughput of the data flow.

In some cases, additionally or alternatively, the first UE may admit the new data flow based on system congestion or system resource availability. In such cases, the first UE may determine channel resource requirements for the data flow based at least in part on an amount of resources required to provide the QoS associated with the data flow, a data rate of the data flow, a priority of the data flow, an anticipated number of retransmissions associated with the data flow, or any combinations thereof. In some cases, the first UE may determine other resource commitments (e.g., based on one or more other flows that are to be maintained with a base station or one or more other sidelink UEs), a channel busy ratio (CBR) associated with the wireless link that indicates channel congestion, or combinations thereof. In some cases, the first UE may determine the system congestion or system resource availability based on a mapping between a channel resource availability table and one or more of a priority of the data flow, the CBR associated with the link, or a packet delay budget (PDB) of the data flow. In other cases, the first UE may conduct a medium access control (MAC) layer pseudo-resource selection for the first data flow based on a number of different possible data arrival times, and determine whether transmission resources are available for more than a predetermined percentage of the number of different possible data arrival times.

Techniques such as discussed herein thus provide for enhanced reliability and efficiency for sidelink communications. For example, a UE may not establish a data flow when it is determined that the sidelink connection is unable to support the data flow. Thus, rather than consume resources for communications that have a relatively low likelihood of successful receipt, system resources may be used for more reliable communications which thereby enhances system efficiency and reliability. Further, in some cases a sidelink UE may determine that a reduced QoS may be supported, and a data flow may be modified to accommodate the reduced QoS (e.g., by relaxing a PDB), and thereby further enhance system efficiency.

Aspects of the disclosure are initially described in the context of a wireless communications system. Various examples of sidelink data flow admission techniques for unicast, multicast, or broadcast sidelink communications and then discussed. Aspects of the disclosure are further illustrated by and described with reference to apparatus diagrams, system diagrams, and flowcharts that relate to techniques for controlling admission for sidelink communications.

FIG. 1 illustrates an example of a wireless communications system 100 that supports techniques for controlling admission for sidelink communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 via a sidelink connection 135 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group (e.g., in a connection-based multicast configuration). In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, when two or more UEs 115 of wireless communications system 100 establish a sidelink connection 135, a first UE 115 that is initiating sidelink communications may evaluate whether the sidelink connection 135 can support a QoS for a data flow prior to admitting the data flow. In some cases, the first UE 115 may evaluate a link quality with one or more other UEs 115 that are to use the data flow on the sidelink connection 135, evaluate system congestion of time/frequency resources that are available for the sidelink connection 135, or any combinations thereof, and admit the data flow based on the evaluation. In some cases, link quality of the sidelink connection 135 may be determined based on a type of communication associated with the data flow, such as unicast communications with one other UE 115 (e.g., a second UE or a receiving UE), multicast communications with multiple other UEs 115, or broadcast transmissions to multiple UEs 115.

Figure 2:
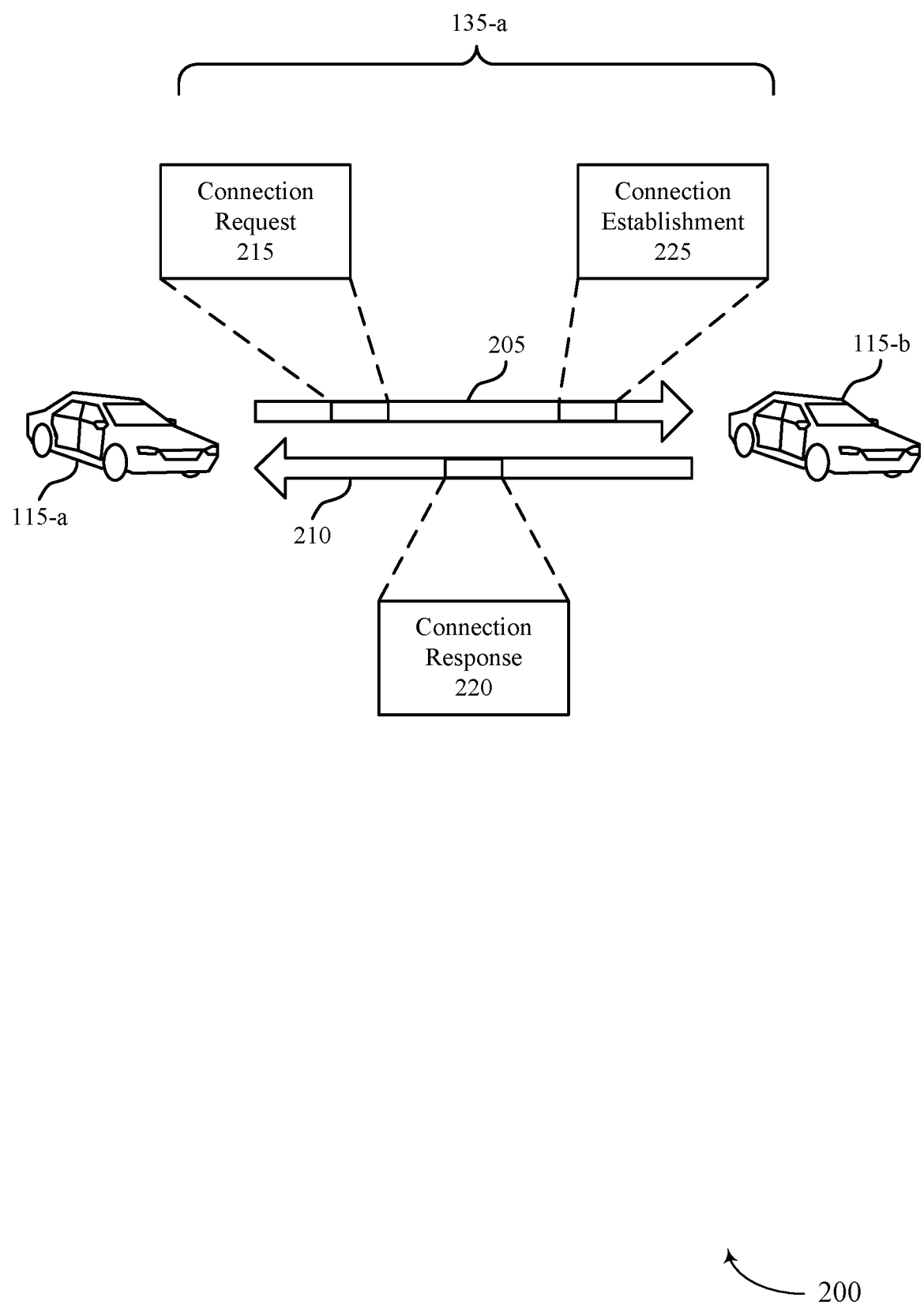
FIG. 2 illustrates an example of a unicast sidelink configuration that supports techniques for controlling admission for sidelink communications in accordance with aspects of the present disclosure.

FIG. 2 illustrates an example of a unicast sidelink configuration 200 that supports techniques for controlling admission for sidelink communications in accordance with aspects of the present disclosure. In some examples, unicast sidelink configuration 200 may implement aspects of wireless communications system 100. A wireless communications system of this example may include a first UE 115-*a* and a second UE 115-*b*, which may be examples of UEs 115 as described above with reference to FIG. 1. In this example, UEs 115 may establish a unicast sidelink connection 135-*a*. For example, UE 115-*a* may attempt to establish a unicast connection over a sidelink with UE 115-*b*. As shown, UE 115-*a* and UE 115-*b* may be vehicles, where the unicast connection over the sidelink may be a V2X communication link between UE 115-*a* (e.g., a first UE) and UE 115-*b* (e.g., a second UE). Additionally or alternatively, the unicast connection over the sidelink may generally be used for sidelink communications between any two UEs 115 or any two similar wireless devices.

In some cases, the first UE 115-*a* may be referred to as an initiating or transmitting UE 115 that initiates the unicast connection procedure, and second UE 115-*b* may be referred to as a target or receiving UE 115 that is targeted for the unicast connection procedure by the first UE 115. Such a sidelink connection 135-*a* may be established in accordance with established connection procedures. In some cases, the sidelink connection 135-*a* may be a PC5 connection for sidelink communications, and an associated V2X layer may have a transmission profile or transport profile configured that is associated with a QoS flow. After identifying a potential unicast connection target (e.g., second UE 115-*b*), the first UE 115-*a* may transmit a connection request 215 using a first signaling radio bearer 205. In some cases, the connection request 215 may be a RRC message transmitted by first UE 115-*a* to request a unicast connection with second UE 115-*b* (e.g., an RRCDirectConnectionSetupRequest message).

After receiving the connection request 215, second UE 115-*b* may determine whether to accept or reject the connection request 215. Second UE 115-*b* may base this determination on a transmission/reception capability, an ability to accommodate the unicast connection over the sidelink, a particular service indicated for the unicast connection, the contents to be transmitted over the unicast connection, or a combination thereof. Accordingly, second UE 115-*b* may transmit a connection response 220 (e.g., an RRCDirectConnectionResponse message) via second signaling radio bearer 210 that provides an indication of whether the request is accepted or rejected. Assuming that the connection is accepted by the second UE 115-*b*, the first UE 115-*a* may transmit a connection establishment 225 message (e.g., an RRCDirectConnectionSetupComplete RRC message) that establishes the sidelink connection 135-*a*. In some cases, sidelink signaling radio bearers 205 and 210 may be a same sidelink radio signal bearer or may be separate sidelink signaling radio bearers.

In some cases, prior to admitting a data flow that is to use the sidelink connection 135-*a*, admission control techniques may be used to determine whether or not QoS targets of the new data flow can be met. For example, data packets from multiple applications at the first UE may be multiplexed into a QoS flow based on QoS mapping rules, and each QoS flow may be associated with certain QoS requirements. Such QoS requirements may include, for example, data priority, PDB, reliability or packet error rate, GBR, and the like. Based on the QoS requirements, the first UE 115-*a* may determine physical layer transmission parameters needed to meet the QoS requirements.

In some cases, an application ID (e.g., a provider service identifier (PSID)) of an application of the first UE 115-*a* that is serviced by the QoS flow may be mapped to a transmission profile, and when multiple applications are mapped to the same QoS flow, the transmission profile for the multiple applications (e.g., flows with multiple PSIDs) may map to a same transmission profile. Such a transmission profile may include, for example, a radio access technology (RAT) selection (e.g., PC5 LTE Release 14, PC5 LTE Release 15, PC5 NR Release 16, etc.), and one or more UE 115 feature selections (e.g., 64QAM with LTE Release 15, HARQ feedback, etc.). Further, corresponding to each transmission profile, access layers of the first UE 115-*a* may be configured with further detailed physical layer parameters to use for that profile (e.g., with HARQ selected, the maximum and the minimum number of HARQ processes to be used to meet the desired QoS requirements, range indicator, etc.). The first UE 115-*a* can then deduce the QoS requirements for the data flow, and the associated transmission parameters (e.g., RAT, number of HARQ processes, resource requirement, spectral efficiency requirements, etc.) to meet the QoS requirements as per the transmission profile.

In some cases, for unicast communications such as illustrated in FIG. 2, the first UE 115-*a* may determine whether to admit the new data flow. Such a determination may be made based on techniques as discussed herein where the first UE 115-*a* evaluates link quality of the sidelink connection 135-*a*, a system congestion, or both. In some cases, link quality may be determined based on CQI feedback, and the first UE 115-*a* may transmit a reference signal (e.g., a CSI-RS) and receive one or more measurement reports from the second UE 115-*b*. The first UE 115-*a* may determine whether the link quality (e.g., CQI/SNR) based on the measurement report(s) can support the QoS of the data flow. Further, the first UE 115-*a* may determine available throughput due to time multiplexing with other links. While the various examples discussed herein describe that the first UE 115-*a* makes certain determinations, it is to be understood that such determinations may be made by any initiating UE or sidelink device, and in some cases may also be made by a receiving UE based on a request to establish a data flow.

Additionally or alternatively, the first UE 115-*a* may admit the new data flow based on system congestion or system resource availability (e.g., whether or not the first UE 115-*a* is expected to be able to find time/frequency resources (with the desired SINR quality) to transmit for that link given the congestion in the link). In such cases, the first UE 115-*a* may determine channel resource requirements for the data flow based on an amount of resources required to provide the QoS associated with the data flow, a data rate of the data flow, a priority of the data flow, an anticipated number of retransmissions associated with the data flow, or any combinations thereof. In some cases, the first UE 115-*a* may determine other resource commitments (e.g., based on one or more other flows that are to be maintained with a base station or one or more other sidelink UEs), a CBR associated with the wireless channel that indicates channel congestion, or combinations thereof.

When determining link quality for an evaluation of a new data flow, and the first UE 115-*a* and the second UE 115-*b* already have the sidelink connection 135-*a* established, the determination may be made based on the measurements performed using the existing link. Further, in such cases, information on the second UE 115-*b* schedule (e.g., to determine the time availability of the second UE 115-*b* to support the new data flow) can be exchanged using communication over the existing link. In cases where the first UE 115-*a* and the second UE 115-*b* do not have a link established prior to initiating the new data flow, a signaling procedure such as discussed above (e.g., a PC5 signaling procedure) may be triggered by the first UE 115-*a* to contact the second UE 115-*b* and the measurements (e.g., CQI/SINR measurements) may be performed as part of an initial link quality assessment procedure. For example, the first UE 115-*a* may transmit a CSI-RS to the second UE 115-*b*, and the second UE 115-*b* may measure the CSI-RS and transmit a feedback with the CQI (e.g., a channel quality indicator, link spectral efficiency that can be supported, etc.), rank indicator (RI) information, precoder matrix index (PMI) information, or any combinations thereof.

The first UE 115-*a* may then utilize one or more items of this feedback information to determine whether or not the link quality is sufficient to meet the desired QoS requirements of the new data flow. For example, the first UE 115-*a* may determine if the desired spectral efficiency to meet the QoS can be met by the CQI seen by the second UE 115-*b*, or the first UE 115-*a* may determine if some PMI (i.e., beamforming) restrictions apply at the second UE 115-*b* (e.g., due to the second UE 115-*b* beamforming to other links and the required beamforming for the first UE 115-*a* is different and hence will have to be time-multiplexed, leading to throughput loss at the first UE 115-*a*).

In some cases, the link quality assessment may additionally be based on a time-availability or schedule of the first UE 115-*a* and the second UE 115-*b* to participate in communications for this link. For example, each UE 115 maybe participating in multiple different links and may not be available to receive or transmit for the evaluated link at certain times (e.g., the second UE 115-*b* may not be available to receive from the first UE 115-*a* in certain slots due to prior commitments to transmit to some other UE during those slots). Thus, such time-availability or schedule information may impact the peak throughput achievable for the new data flow.

Thus, the first UE 115-*a* may perform the link quality assessment based on CSI (e.g., CQI, RI, PMI, etc.), plus time-availability or scheduling restrictions to meet those CSI and schedules. In some cases, such a link quality assessment may be performed alone at the first UE 115-*a*. In other cases, the first UE 115-*a* may transmit a request to the second UE 115-*b*, and the second UE 115-*b* may transmit feedback with CSI and the time-availability or schedule for this link, or may indicate a peak throughput for the link. In other cases, the link quality assessment may be performed individually at both the first UE 115-*a* and the second UE 115-*b* separately, and the result from the second UE 115-*b* may be communicated to the first UE 115-*a*. In such cases, the first UE 115-*a* may provide the second UE 115-*b* with information related to the new data flow, such as the desired QoS parameters and the transmission profile. Both UEs 115 then determine the admission control outcome, and the second UE 115-*b* may provide feedback on the determination to the first UE 115-*a*.

As indicated above, additionally or alternatively, admission control for the new data flow may be based on system congestion or system resource availability. In such cases, the first UE 115-*a* may identify the transmission profile and the corresponding RRC configuration of the first UE 115-*a* to determine the physical layer transmission parameters to support the data flow and the associated data rate requirements. Such a determination may include identifying the time and/or frequency resource requirements of the data flow (e.g., 1 slot and 10 RBs with 4 retransmissions every 20 ms). Based on the priority associated with the data flow, the first UE 115-*a* may determine if the required time-frequency resources are available for transmissions that support the data flow. In some cases, the first UE 115-*a* may use established resource selection procedures to identify resources. In such cases, admission control then requires the same determination (on average) of available resources within the PDB window with the desired HARQ retransmissions, and whether or not they exceed the required time-frequency resources for the data flow. The first UE 115-*a* may, in some cases, determine the average resource availability for communications corresponding to the data flow based on one or more of a priority of the data flow, time-frequency resource requirements to meet the QoS of the data flow, a CBR (i.e., channel congestion), or any combinations thereof. If the number of available time-frequency resources, on average, that meet the CQI requirements exceed the amount of time-frequency resources to support the data flow, then the first UE 115-*a* may admit the new data flow.

When evaluating system congestion or system resource availability, the first UE 115-*a* may, in some cases, use a mapping to determine if the available time-frequency resources are sufficient to support the data flow. For example, the first UE 115-*a* may be configured with a table that maps CBR, priority, and a number of resource blocks, to whether the resource is available or not. In some cases, such a table may be updated based on CBR measurements of the UEs. In such cases, after the first UE 115-*a* identifies the resource requirements of the new data flow (e.g., based on the data rate, and HARQ requirements for the data flow), it checks this table to examine whether resource selection will be successful or not. In some other cases, the mapping may also be based on the PDB of the data flow, and the table may have the additional dimension for the PDB such that, for a smaller PDB, a certain number of RBs needed to support the data flow would need lower a CBR value. Such mappings for determination of system congestion or system resource availability may allow for efficient determination based on predetermined mappings that may be provided to UEs 115 and periodically updated based on system conditions.

In some cases, when evaluating system congestion or system resource availability, the first UE 115-*a* may conduct a MAC layer pseudo-resource selection once the resource requirement is determined for a given data flow. In such cases, the exact data arrival for data packets of the data flow is not known in advance, the first UE 115-*a* may evaluate resource availability (i.e., based on a pseudo-resource selection) for a number of different possible data arrival times within a resource reservation interval, and determine whether the particular resource selection will succeed. Then, a threshold (e.g., based on a predetermined percentage that may be associated with different QoS requirements) can be configured to evaluate the expected chances of successful transmissions. In some cases, among all the pseudo-resource selections, the data flow may be admitted if the number of successes exceed a predefined threshold ratio.

In some cases, the outcome of the admission control decision may be a binary admit or do-not-admit decision. Thus, the new data flow may be admitted if the binary decision is to admit the flow, and may not be admitted otherwise. In other cases, if the first UE 115-*a* determines that the new data flow is not admissible, then the first UE 115-*a* may also determine reduced QoS requirements that could be met based on the link quality assessment and the system congestion. This reduced QoS information may be provided to an application that is associated with the data flow to determine if the application may accept downgraded service requirements. In some cases, if the application indicates that a reduced QoS would still be acceptable, the first UE 115-*a* may admit the new data flow based on the reduced QoS.

Figure 3:
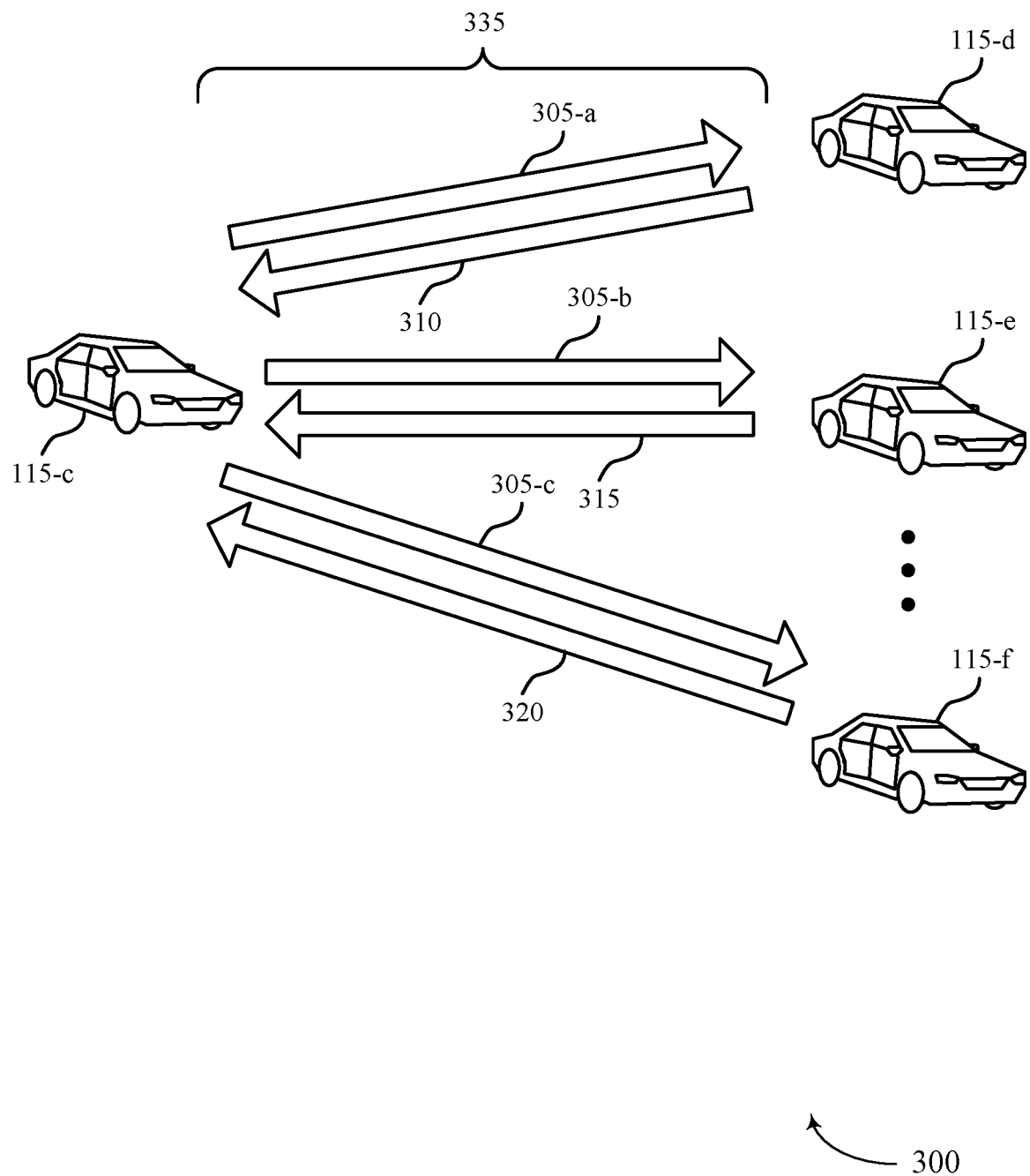
FIG. 3 illustrates an example of a multicast sidelink configuration that supports techniques for controlling admission for sidelink communications in accordance with aspects of the present disclosure.

FIG. 3 illustrates an example of a multicast sidelink configuration 300 that supports techniques for controlling admission for sidelink communications in accordance with aspects of the present disclosure. In some examples, multicast sidelink configuration 300 may implement aspects of wireless communications system 100. A wireless communications system of this example may include a first UE 115-*c* and a number of receiving UEs 115-*d* through 115-*f*, which may be examples of UEs 115 as described above with reference to FIG. 1 or 2. In this example, UEs 115 may establish connection-based multicast sidelink connections 335 with each of the receiving UEs 115-*d* through 115-*f*. As shown, UEs 115 may be vehicles, where the multicast sidelink connections 335 over the sidelink may provide V2X communication links between the first UE 115-*c* and the receiving UEs 115-*d* through 115-*f*.

In this example, the first UE 115-*c* may transmit signals 305 to the multiple receiving UEs 115-*d* through 115-*f*, and may receive communications 310 through 320 (e.g., feedback, CQI, etc.) from the receiving UEs 115-*d* through 115-*f*, respectively. In this example, each of the UEs 115 may belong to a multicast group, or a groupcast group, in which all of the group members are known to each UE 115 in the group. In this example, since all of the group members are known, similar techniques as discussed for unicast admission control with reference to FIG. 2 may be performed individually for each of the receiving UEs 115-*d* through 115-*f*. In such cases, determination of admission control at the first UE 115-*c* may be based on aggregated feedback from all of the receiving UEs 115-*d* through 115-*f*. In some cases, the first UE 115-*c* may determine to admit a data flow based on a certain percentage (e.g., 90%) of the group members can meet the QoS requirement. In some cases, the percentage of group members that can meet the QoS requirement may also be based on the QoS requirement.

In other cases, connection-less multicast communications may be used, in which separate connections between the first UE 115-c and the receiving UEs 115-d through 115-f are not established. In such cases, the communications 310 through 320 from the receiving UEs 115-d through 115-f may include only feedback information (e.g., HARQ NACK feedback information, with no HARQ ACK or CQI provided by receiving UEs). In some cases, the first UE 115-c may evaluate data flow admissions based on transmitting one or more dummy or test information packets (or RRC signaling) at the desired spectral efficiency and resource utilization (i.e., at desired time-frequency resources and numbers of HARQ retransmission) as required for the data flow, and monitoring for NACK transmissions of the receiving UEs 115-d through 115-f. In some cases, a feedback range may be set to a same value as the range required for the application/service associated with the data flow. If one or more NACKs are received at the first UE 115-c, it may determine that the data flow is not admissible. In some cases, a predetermined number of NACKs may result in the data flow not being admitted. If no NACKs are received at the first UE 115-c, it may be assumed that the flow is admissible, with the understanding that it is not guaranteed as one or more of the receiving UEs 115-d through 115-f may not have even received control information that indicates the test transmission.

Figure 4:
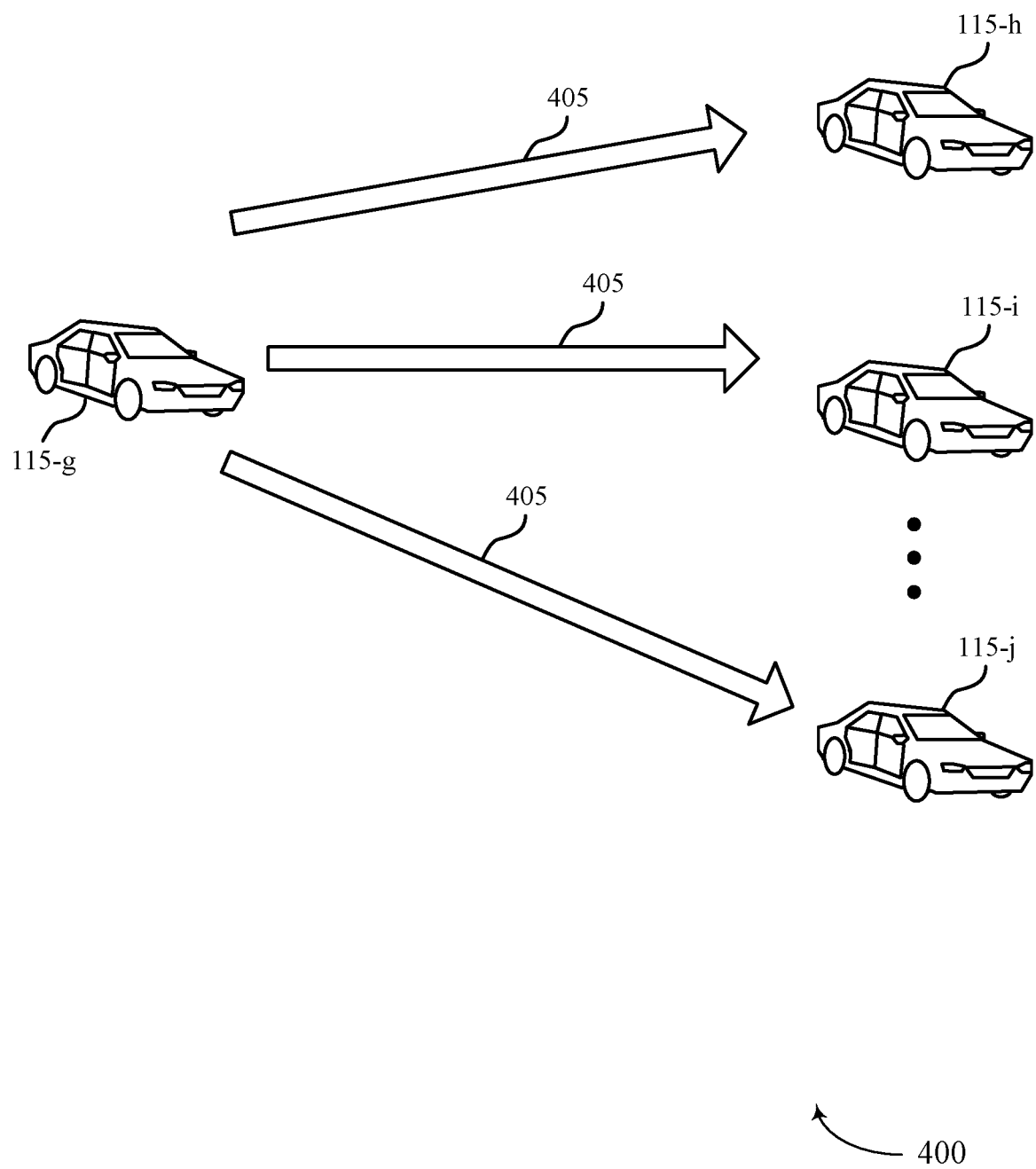
FIG. 4 illustrates an example of a broadcast sidelink configuration that supports techniques for controlling admission for sidelink communications in accordance with aspects of the present disclosure.

FIG. 4 illustrates an example of a broadcast sidelink configuration 400 that supports techniques for controlling admission for sidelink communications in accordance with aspects of the present disclosure. In some examples, broadcast sidelink configuration 400 may implement aspects of wireless communications system 100. A wireless communications system of this example may include a first UE 115-g and a number of receiving UEs 115-h through 115-j, which may be examples of UEs 115 as described above with reference to FIGS. 1 through 3. In this example, UEs 115 may participate in broadcast sidelink communications, with each of the receiving UEs 115-h through 115-j receiving a same broadcast transmission 405 from the first UE 115-g. As shown, UEs 115 may be vehicles, where the multicast connections 435 over the sidelink may provide V2X communication links between the first UE 115-g and the receiving UEs 115-h through 115-j.

When operating in such a configuration, the receiving UEs 115-h through 115-j do not provide any feedback (e.g., no HARQ ACK/NACK or CQI) for link quality determination. In such cases, admission control may be evaluated based on only the first UE 115-g conditions. For example, the first UE 115-g may determine based on existing scheduling whether the data flow can be supported. For example, based on existing resource commitments, the first UE 115-g may determine if it can multiplex transmissions of the new data flow around other scheduled transmissions. If prior scheduling commitments prevents the first UE 115-g from meeting the desired throughput requirements based on the QoS of the data flow, assuming perfect reception at the receiving UEs 115-h through 115-j, the new data flow may not be admitted, and may otherwise be admitted. Similarly as discussed with respect to FIG. 2, in some case if the first UE 115-g determines that the data flow may not be admitted, but a reduced QoS may be supported, an indication of the reduced QoS may be provided to the application to determine if a reduced QoS is to be used.

Figure 5:
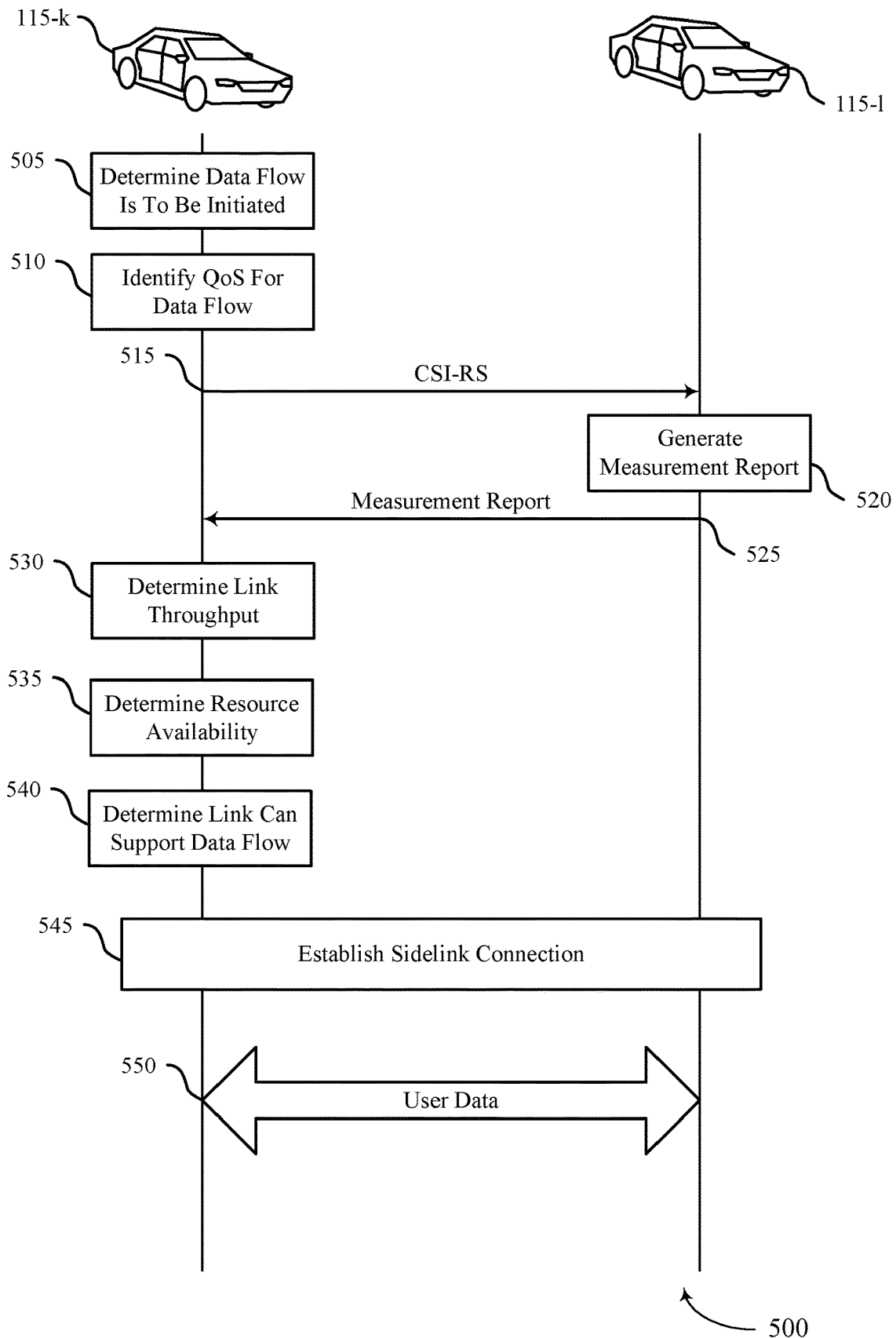
FIG. 5 illustrates an example of a process flow that supports techniques for controlling admission for sidelink communications in accordance with aspects of the present disclosure.

FIG. 5 illustrates an example of a process flow 500 that supports techniques for controlling admission for sidelink communications in accordance with aspects of the present disclosure. In some examples, process flow 500 may implement aspects of wireless communications system 100. Process flow 500 may include a first UE 115-k and a second UE 115-l, which may be examples of UEs 115 as described above with reference to FIGS. 1-4. As described herein, first UE 115-k may attempt to establish a unicast connection, or a connection-based multicast connection, over a sidelink with second UE 115-l. As shown, UEs 115 may be vehicles, where the unicast connection over the sidelink may be a V2X communication link. Additionally or alternatively, the unicast connection over the sidelink may generally be used for sidelink communications between any two UEs 115. In some cases, first UE 115-k may be referred to as an initiating UE 115 that initiates the sidelink connection procedure, and second UE 115-l may be referred to as a receiving or target UE 115 that is targeted for the sidelink connection procedure.

In the following description of the process flow 500, the operations between first UE 115-k and second UE 115-l may be performed in different orders or at different times. Certain operations may also be left out of the process flow 500, or other operations may be added to the process flow 500. It is to be understood that while first UE 115-k and second UE 115-l are shown performing a number of the operations of process flow 500, any wireless device may perform the operations shown.

At 505, first UE 115-k may determine that a data flow is to be initiated. In some cases, an application at the first UE 115-k may provide a request for an application, and the first UE 115-k may determine that a sidelink connection is needed to service the request.

At 510, the first UE 115-k may identify a QoS for the data flow. In some cases, the QoS may be determined based on a PSID of the application that is requesting the data flow. In some cases, a transmission profile associated with the PSID may be used to determine one or more different QoS parameters associated with the new data flow.

At 515, the first UE 115-k may transmit a CSI-RS, which may be received at the second UE 115-l. At 520, the second UE 115-l may generate a measurement report based on one or more channel measurements made for the CSI-RS. In some cases, the measurement report may include a CQI index, RI, PMI, or any combinations thereof. At 525, the second UE 115-l may transmit the measurement report to the first UE 115-k.

At 530, the first UE 115-k may determine a link throughput that is required in order to meet the QoS associated with the new data flow. In some cases, the first UE 115-k may determine the link throughput based on an expected amount of data to be transmitted and the QoS of the data flow.

At 535, the first UE 115-k may determine resource availability for the data flow. In some cases, the determination of resource availability may be used on the CQI/RI/PMI of the link, other scheduled transmissions of the first UE 115-k of the second UE 115-l, a channel congestion associated with the sidelink channel, a priority of the data flow relative to priorities of other scheduled transmissions, or any combinations thereof. At 540, the first UE 115-k may determine that the link can support the data flow based on the determined link throughput and resource availability. In some cases, the first UE 115-k may determine that the link cannot support the data flow, and in such cases the first UE 115-k may discontinue operations. In other cases, upon determining that the link cannot support the data flow, the first UE 115-k may determine that a reduced QoS can be supported and may determine if the application requesting the data flow can accept the reduced QoS.

At 545, based on the determination that the link can support the data flow, the first UE 115-*k* and the second UE 115-*l* may establish a sidelink connection that includes the data flow. In some cases, the sidelink connection may be an existing sidelink connection that also supports the new data flow. In other cases, the sidelink connection may be a new sidelink connection. In some cases, the sidelink connection may be a unicast sidelink connection, or may be a connection-based multicast sidelink connection, which may, at 550, be used to communicate user data.

Figure 6:
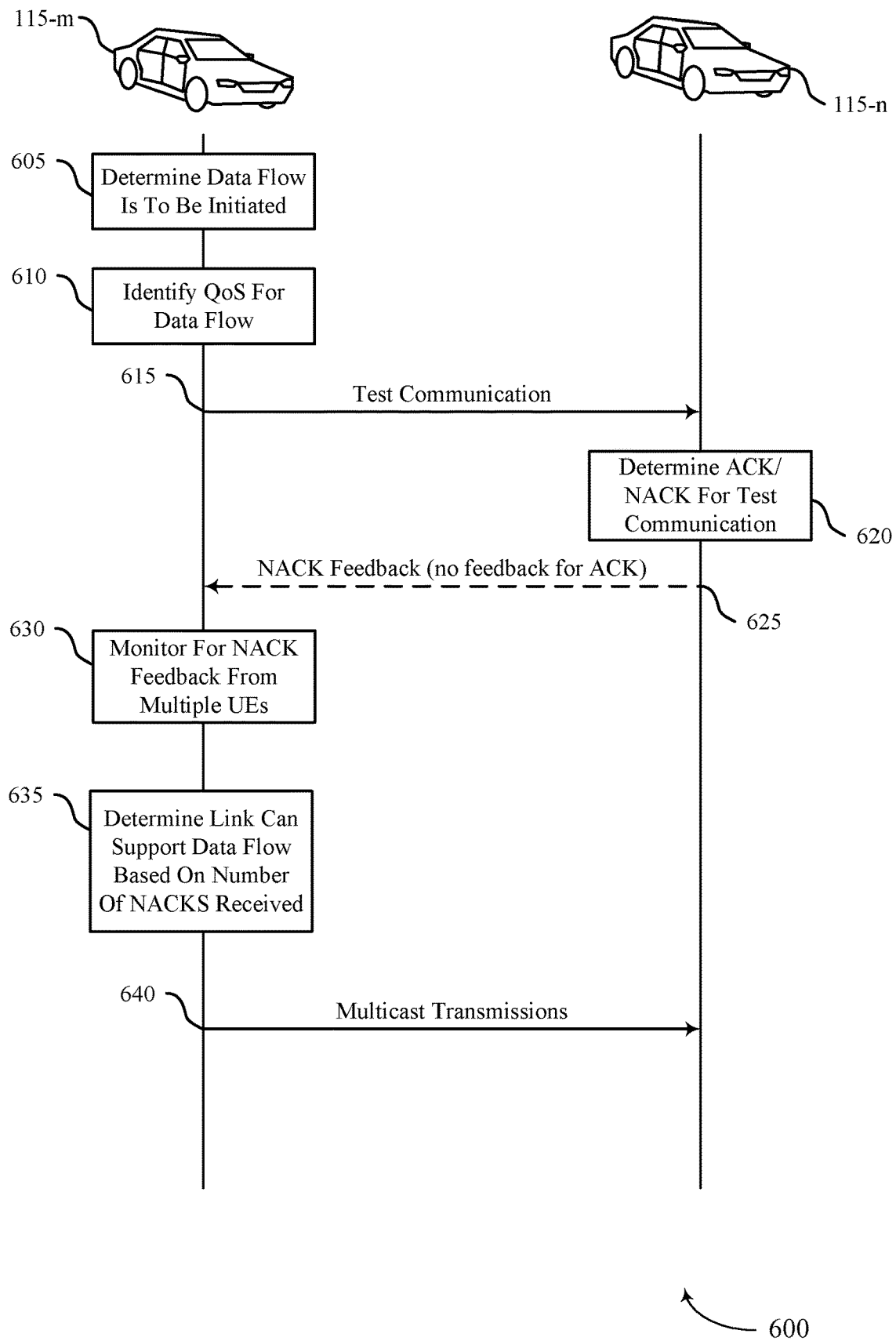
FIG. 6 illustrates an example of a process flow that supports techniques for controlling admission for sidelink communications in accordance with aspects of the present disclosure.

FIG. 6 illustrates an example of a process flow 600 that supports techniques for controlling admission for sidelink communications in accordance with aspects of the present disclosure. In some examples, process flow 600 may implement aspects of wireless communications system 100. Process flow 600 may include a first UE 115-*m* and a second UE 115-*n*, which may be examples of UEs 115 as described above with reference to FIGS. 1-4. As described herein, first UE 115-*m* may attempt to establish a connection-less multicast connection, over a sidelink with multiple UEs including second UE 115-*n*, where only second UE 115-*n* is illustrated for simplicity and purposes of discussion with the understanding that other of the UEs operate in a similar manner. As shown, UEs 115 may be vehicles, where the sidelink may be a V2X communication link.

In the following description of the process flow 600, the operations between first UE 115-*m* and second UE 115-*n* may be performed in different orders or at different times. Certain operations may also be left out of the process flow 600, or other operations may be added to the process flow 600. It is to be understood that while first UE 115-*m* and second UE 115-*n* are shown performing a number of the operations of process flow 600, any wireless device may perform the operations shown.

At 605, first UE 115-*m* may determine that a data flow is to be initiated. In some cases, an application at the first UE 115-*m* may provide a request for an application, and the first UE 115-*m* may determine that sidelink connection-less multicast communications are needed to service the request.

At 610, the first UE 115-*m* may identify a QoS for the data flow. In some cases, the QoS may be determined based on a PSID of the application that is requesting the data flow. In some cases, a transmission profile associated with the PSID may be used to determine one or more different QoS parameters associated with the new data flow.

At 615, the first UE 115-*m* may transmit a test communication (or test RRC signaling). In some cases, the test communication may be transmitted using transmission parameters associated with the data flow. The test communication may be received at the second UE 115-*n*, and one or more other UEs of the connection-less multicast UEs that are to receive the communications from the first UE 115-*m*. At 620, the second UE 115-*n* may determine whether the test communication was properly received and determine an ACK/NACK for the transmission. In cases where a NACK is determined, at 625, the second UE 115-*n* may transmit NACK feedback to the first UE 115-*m*.

At 630, the first UE 115-*m* may monitor for NACK feedback based on the test communication. In some cases, the first UE 115-*m* may monitor for a time period associated with HARQ feedback transmissions based on the test communication. At 635, the first UE 115-*m* may determine, based on a number of NACKs received from the test transmission, whether the multicast sidelink can support the data flow. In some cases, if one NACK is received, the first UE 115-*m* may determine that the data flow is not supported. In other cases, a threshold number of NACKs may be configured (e.g., based on a QoS of the data flow, a preconfigured threshold, etc.), and if fewer than the threshold number of NACKs are received, the first UE 115-*m* may determine that the data flow is supported. Otherwise, the data flow may be unsupported. At 640, the first UE 115-*m*, based on the determination that the data flow is supported, may transmit multicast transmissions, which may be received at the second UE 115-*n* and one or more other UEs that are to receive the multicast transmissions.

Figure 7:
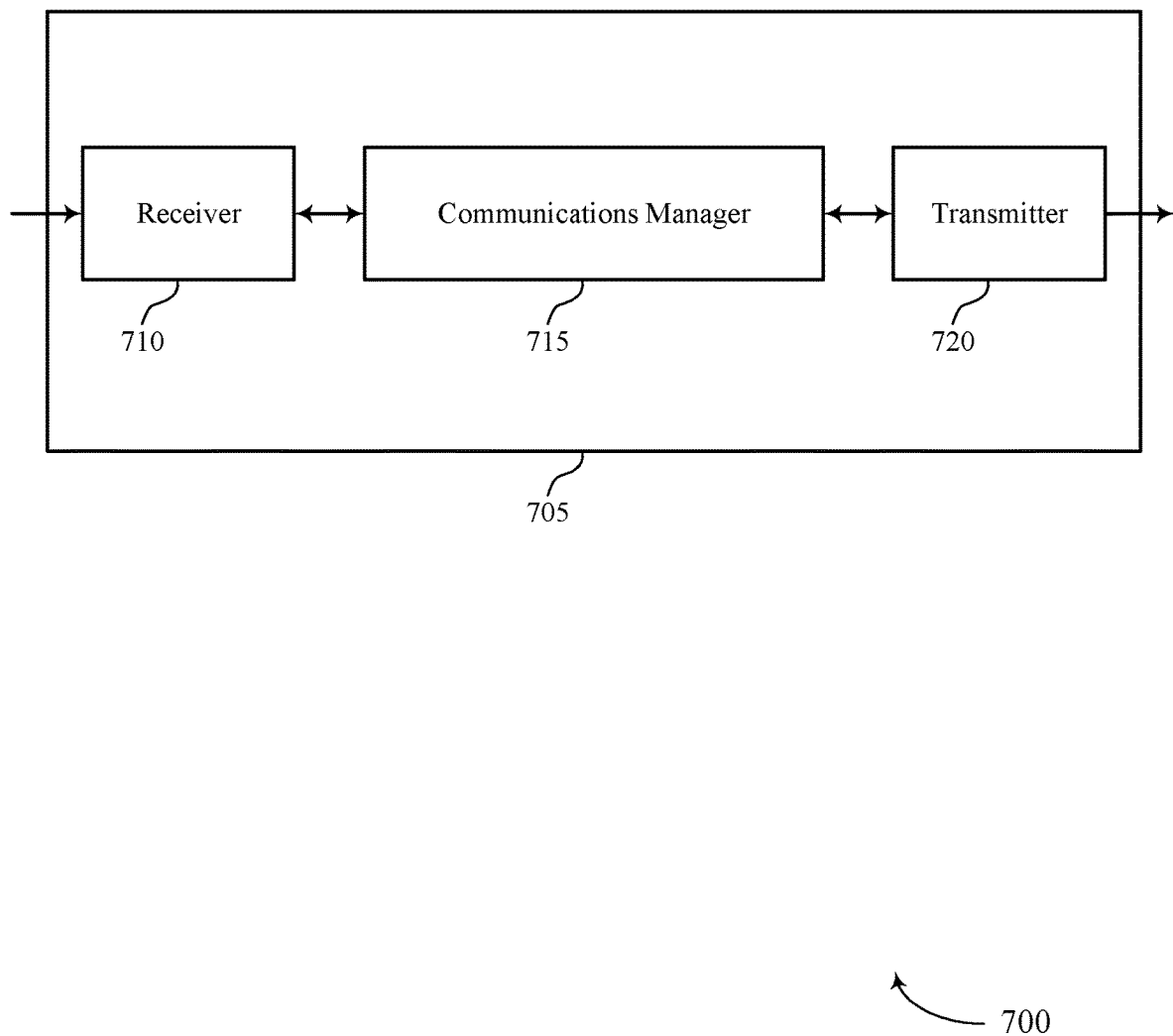
FIGS. 7 and 8 show block diagrams of devices that support techniques for controlling admission for sidelink communications in accordance with aspects of the present disclosure.

FIG. 7 shows a block diagram 700 of a device 705 that supports techniques for controlling admission for sidelink communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for controlling admission for sidelink communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive an indication that a first data flow is to be initiated in a device-to-device sidelink connection between a first UE and a second UE, identify a quality of service associated with the first data flow, determine that a first link between the first UE and the second UE can support the first data flow based on the quality of service associated with the first data flow and an available throughput of the first link, where the available throughput of the first link is based on multiplexing the first link with one or more other links of the first UE, and establish the first data flow with the second UE based on the determination.

The communications manager 715 may also receive an indication that a first data flow is to be initiated in a multicast device-to-device sidelink connection between the first UE and a set of other UEs, where the first UE has a set of links that each correspond to a respective second UE of the set of other UEs, identify a quality of service associated with the first data flow, determine a link quality for each of the set of links, each link quality determined based on a corresponding channel quality and available channel throughput associated with the corresponding link of the set of links, and establish the first data flow with the set of other UEs based on at least a predetermined number of the set of links having a link quality that supports the quality of service associated with the first data flow.

The communications manager 715 may also receive an indication that a first data flow is to be initiated in a multicast device-to-device sidelink connection between the first UE and a set of other UEs, identify a quality of service associated with the first data flow, transmit a test communication to the set of other UEs based on the quality of service associated with the first data flow, monitor for one or more negative acknowledgments from one or more of the set of other UEs, and transmit the first data flow based on receiving fewer than a threshold number of negative acknowledgments associated with the test communication.

The communications manager 715 may also receive an indication that a first data flow is to be initiated in a broadcast device-to-device sidelink connection between the first UE and a set of other UEs, identify a quality of service associated with the first data flow, determine that the first UE can support the first data flow based on the quality of service associated with the first data flow and an available throughput of broadcast transmissions based on multiplexing the first data flow with transmissions of one or more other data flows of the first UE, and transmit broadcast communications of the first data flow based on the determining.

The communications manager 715 may also receive an indication that a first data flow is to be initiated in a device-to-device sidelink connection between the first UE and at least a second UE, identify a quality of service associated with the first data flow, determine channel resource requirements for the first data flow based on one or more of an amount of resources required to provide the quality of service associated with the first data flow, a data rate of the first data flow, a priority of the first data flow, an anticipated number of retransmissions associated with the first data flow, or any combinations thereof, determine an average resource availability for transmissions of the first data flow based on a channel busy ratio associated with a first link between the first UE and at least the second UE, and establish the first data flow with the second UE based on the average resource availability being sufficient to meet the channel resource requirements.

The communications manager 715 may also receive, at a second UE, an indication from a first UE that a first data flow is to be initiated in a device-to-device sidelink connection between the first UE and the second UE, receive signaling from the first UE to establish the first data flow with the first UE, determine a channel quality of a first link between the first UE and the second UE, and transmit a report to the first UE that indicates the channel quality of the first link and a schedule of the second UE. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
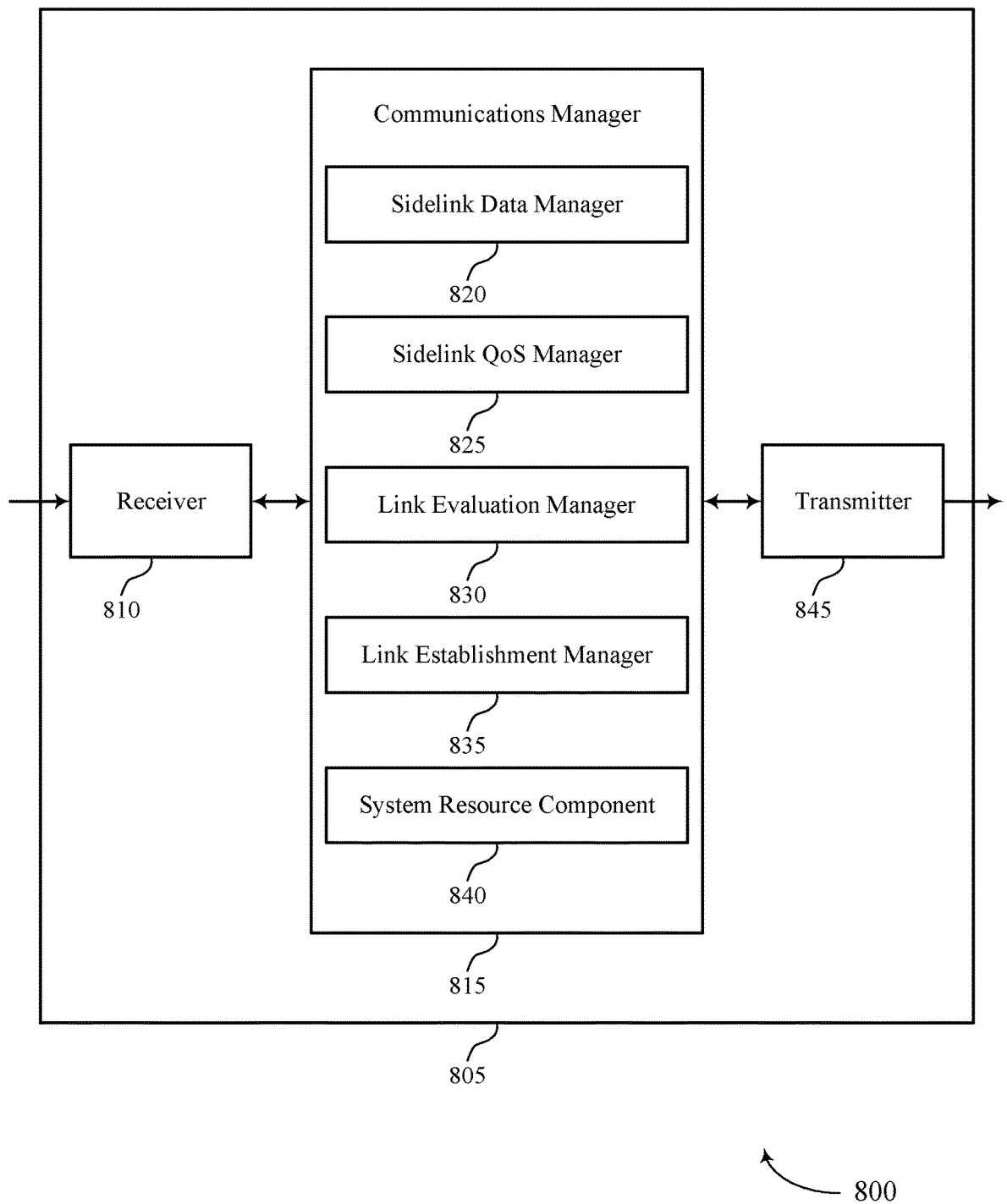

FIG. 8 shows a block diagram 800 of a device 805 that supports techniques for controlling admission for sidelink communications in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to techniques for controlling admission for sidelink communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a sidelink data manager 820, a sidelink QoS manager 825, a link evaluation manager 830, a link establishment manager 835, and a system resource component 840. The communications manager 815 may be an example of aspects of the communications manager 1010 described herein.

In some cases, the sidelink data manager 820 may receive an indication that a first data flow is to be initiated in a device-to-device sidelink connection between a first UE and a second UE. The sidelink QoS manager 825 may identify a quality of service associated with the first data flow. The link evaluation manager 830 may determine that a first link between the first UE and the second UE can support the first data flow based on the quality of service associated with the first data flow and an available throughput of the first link, where the available throughput of the first link is based on multiplexing the first link with one or more other links of the first UE. The link establishment manager 835 may establish the first data flow with the second UE based on the determination.

In some cases, the sidelink data manager 820 may receive an indication that a first data flow is to be initiated in a multicast device-to-device sidelink connection between the first UE and a set of other UEs, where the first UE has a set of links that each correspond to a respective second UE of the set of other UEs. The sidelink QoS manager 825 may identify a quality of service associated with the first data flow. The link evaluation manager 830 may determine a link quality for each of the set of links, each link quality determined based on a corresponding channel quality and available channel throughput associated with the corresponding link of the set of links. The link establishment manager 835 may establish the first data flow with the set of other UEs based on at least a predetermined number of the set of links having a link quality that supports the quality of service associated with the first data flow.

In some cases, the sidelink data manager 820 may receive an indication that a first data flow is to be initiated in a multicast device-to-device sidelink connection between the first UE and a set of other UEs. The sidelink QoS manager 825 may identify a quality of service associated with the first data flow. The link evaluation manager 830 may transmit a test communication to the set of other UEs based on the quality of service associated with the first data flow and monitor for one or more negative acknowledgments from one or more of the set of other UEs. The link establishment manager 835 may transmit the first data flow based on receiving fewer than a threshold number of negative acknowledgments associated with the test communication.

In some cases, the sidelink data manager 820 may receive an indication that a first data flow is to be initiated in a broadcast device-to-device sidelink connection between the first UE and a set of other UEs. The sidelink QoS manager 825 may identify a quality of service associated with the first data flow. The link evaluation manager 830 may determine that the first UE can support the first data flow based on the quality of service associated with the first data flow and an available throughput of broadcast transmissions based on multiplexing the first data flow with transmissions of one or more other data flows of the first UE. The link establishment manager 835 may transmit broadcast communications of the first data flow based on the determining.

In some cases, the sidelink data manager 820 may receive an indication that a first data flow is to be initiated in a device-to-device sidelink connection between the first UE and at least a second UE. The sidelink QoS manager 825 may identify a quality of service associated with the first data flow. The system resource component 840 may determine channel resource requirements for the first data flow based on one or more of an amount of resources required to provide the quality of service associated with the first data flow, a data rate of the first data flow, a priority of the first data flow, an anticipated number of retransmissions associated with the first data flow, or any combinations thereof and determine an average resource availability for transmissions of the first data flow based on a channel busy ratio associated with a first link between the first UE and at least the second UE. The link establishment manager 835 may establish the first data flow with the second UE based on the average resource availability being sufficient to meet the channel resource requirements.

In some cases, the link establishment manager 835 may receive, at a second UE, an indication from a first UE that a first data flow is to be initiated in a device-to-device sidelink connection between the first UE and the second UE and receive signaling from the first UE to establish the first data flow with the first UE. The link evaluation manager 830 may determine a channel quality of a first link between the first UE and the second UE and transmit a report to the first UE that indicates the channel quality of the first link and a schedule of the second UE.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
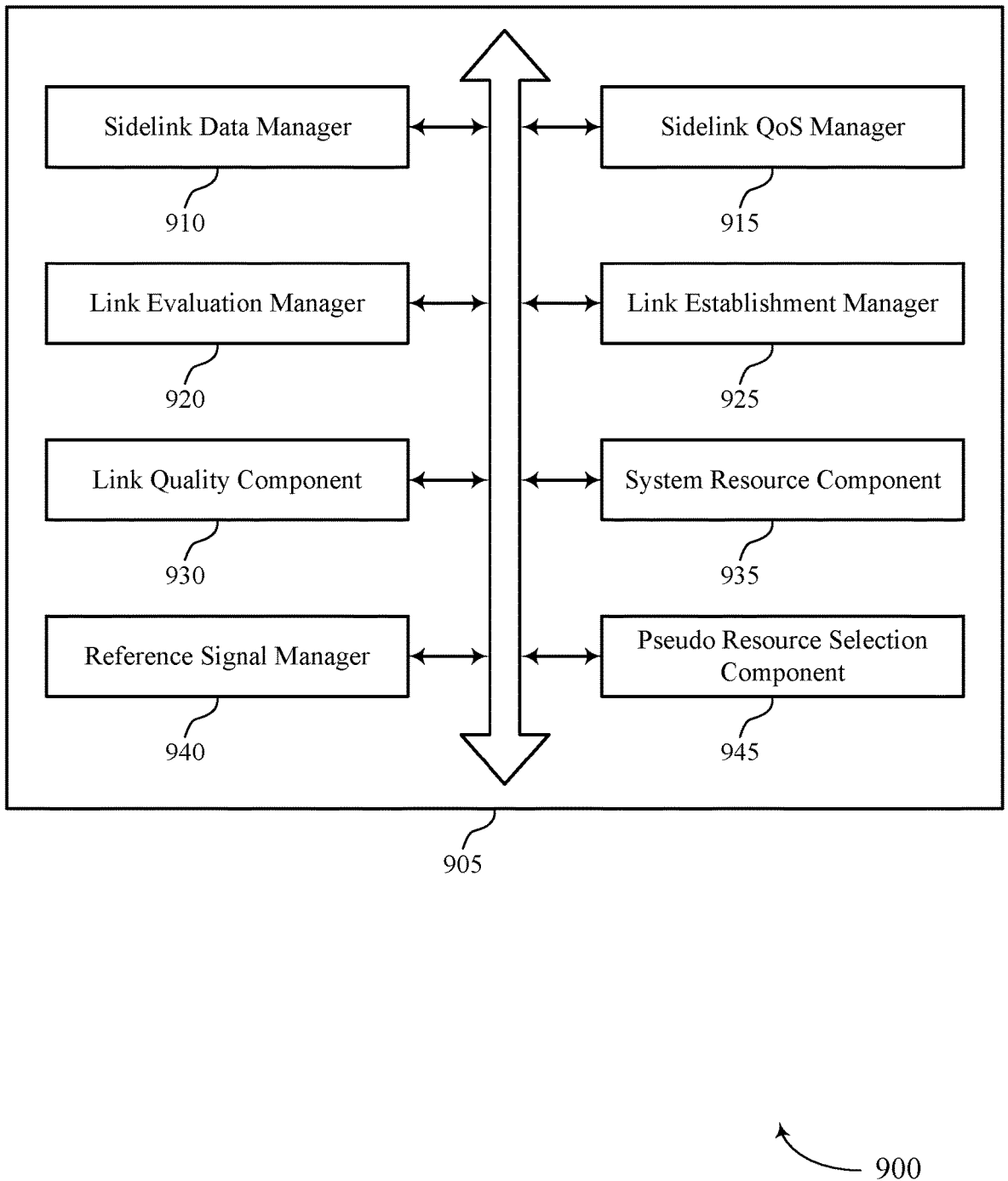
FIG. 9 shows a block diagram of a communications manager that supports techniques for controlling admission for sidelink communications in accordance with aspects of the present disclosure.

FIG. 9 shows a block diagram 900 of a communications manager 905 that supports techniques for controlling admission for sidelink communications in accordance with aspects of the present disclosure. The communications manager 905 may be an example of aspects of a communications manager 715, a communications manager 815, or a communications manager 1010 described herein. The communications manager 905 may include a sidelink data manager 910, a sidelink QoS manager 915, a link evaluation manager 920, a link establishment manager 925, a link quality component 930, a system resource component 935, a reference signal manager 940, and a pseudo resource selection component 945. Each of these modules may communicate, directly or indirectly, with one another (e.g., via one or more buses).

The sidelink data manager 910 may receive an indication that a first data flow is to be initiated in a device-to-device sidelink connection between a first UE and a second UE. In some examples, the sidelink data manager 910 may receive an indication that a first data flow is to be initiated in a multicast device-to-device sidelink connection between the first UE and a set of other UEs, where the first UE has a set of links that each correspond to a respective second UE of the set of other UEs. In some examples, the sidelink data manager 910 may receive an indication that a first data flow is to be initiated in a broadcast device-to-device sidelink connection between the first UE and a set of other UEs.

The sidelink QoS manager 915 may identify a quality of service associated with the first data flow. In some examples, the sidelink QoS manager 915 may receive, from the second UE, an indication that the second UE can support the first data flow, and where the determining that the first link can support the first data flow is further based on the indication that the second UE can support the first data flow.

In some examples, the sidelink QoS manager 915 may determine a reduced quality of service of the first data flow that is supportable by the first link. In some examples, the sidelink QoS manager 915 may provide an indication of the reduced quality of service to an application associated with the first data flow. In some examples, the sidelink QoS manager 915 may receive a response from the application associated with the first data flow that indicates the first data flow is to be transmitted based on the reduced quality of service. In some examples, the sidelink QoS manager 915 may establish the first data flow with the second UE is further based on the reduced quality of service.

In some cases, the quality of service associated with the first data flow is based on one or more of a priority of data to be transmitted using the first data flow, a minimum data rate associated with the first data flow, a packet delay budget associated with the first data flow, or reliability associated with the first data flow.

The link evaluation manager 920 may determine that a first link between the first UE and the second UE can support the first data flow based on the quality of service associated with the first data flow and an available throughput of the first link, where the available throughput of the first link is based on multiplexing the first link with one or more other links of the first UE. In some examples, the link evaluation manager 920 may determine a link quality for each of a set of links of a connection-based multicast, each link quality determined based on a corresponding channel quality and available channel throughput associated with the corresponding link of the set of links.

In some examples, the link evaluation manager 920 may transmit a test communication to the set of other UEs based on the quality of service associated with the first data flow. In some examples, the link evaluation manager 920 may monitor for one or more negative acknowledgments from one or more of the set of other UEs.

In some examples, the link evaluation manager 920 may determine that the first UE can support the first data flow based on the quality of service associated with the first data flow and an available throughput of broadcast transmissions based on multiplexing the first data flow with transmissions of one or more other data flows of the first UE. In some examples, the link evaluation manager 920 may determine a channel quality of a first link between the first UE and the second UE. In some examples, the link evaluation manager 920 may determine the available throughput of the first link based on multiplexing the first data flow with other scheduled communications of one or more of the first UE or the second UE.

In some examples, the link evaluation manager 920 of a second UE may transmit a report to the first UE that indicates the channel quality of the first link and a schedule of the second UE. In some cases, the report to the first UE includes one or more of a channel quality index of the first link, a link spectral efficiency of the first link, a rank indicator of the first link, or a precoding matrix indicator of the first link.

In some examples, the link evaluation manager 920 may determine a link quality assessment based on the channel quality of the first link and the scheduled communications of the first UE and the second UE. In some examples, the link evaluation manager 920 may determine that the first link can support the first data flow based on the link quality assessment and the quality of service of the first data flow.

In some examples, the link evaluation manager 920 may receive a CSI report from the second UE and one or more of a time availability or peak throughput of the second UE. In some examples, the link evaluation manager 920 may determine that the first link can support the first data flow based on the CSI report, the time availability or peak throughput of the second UE, and one or more other data flows of the first UE that are to be multiplexed with the first data flow.

In some examples, the link evaluation manager 920 may determine a target spectral efficiency and resource utilization based on the quality of service associated with the first data flow. In some examples, the link evaluation manager 920 may determine that the second UE can support the first data flow on the first link based on a quality of service associated with the first data flow, the channel quality of the first link, and an available throughput of the first link based on multiplexing the first link with one or more other links of the second UE. In some cases, the establishing the first data flow with the set of other UEs is based on an aggregation of a set of measurement reports.

In some examples, the link evaluation manager 920 may determine link quality based on one or more NACKs received from a test transmission in a connection-less multicast sidelink. In some cases, a feedback range associated with the negative acknowledgments corresponds to a same feedback range as the first data flow. In some cases, the threshold number of negative acknowledgments is based on the quality of service associated with the first data flow. In some cases, the determining is performed based on an absence of retransmissions of the broadcast communications.

The link establishment manager 925 may establish the first data flow with the second UE based on the determination that a unicast connection can support the data flow. In some examples, the link establishment manager 925 may establish the first data flow with the set of other UEs based on at least a predetermined number of the set of links having a link quality that supports the quality of service associated with the first data flow. In some examples, the link establishment manager 925 may transmit the first data flow based on receiving fewer than a threshold number of negative acknowledgments associated with the test communication. In some examples, the link establishment manager 925 may transmit broadcast communications of the first data flow based on determining that the first UE can support the data flow. In some examples, the link establishment manager 925 may establish the first data flow with the second UE based on the average resource availability being sufficient to meet the channel resource requirements.

In some examples, the link establishment manager 925 may receive, at a second UE, an indication from a first UE that a first data flow is to be initiated in a device-to-device sidelink connection between the first UE and the second UE. In some examples, the link establishment manager 925 may receive signaling from the first UE to establish the first data flow with the first UE.

In some examples, the link establishment manager 925 may determine that the first link between the first UE and the second UE does not support the first data flow based on the quality of service associated with the first data flow and the available throughput of the first link.

In some examples, the link establishment manager 925 may transmit a test communication in a connection-less multicast sidelink that includes one or more of a predetermined PDSCH communication, a predetermined PDCCH communication, a predetermined RRC signal, or any combinations thereof. In some examples, the link establishment manager 925 may transmit the test communication according to the target spectral efficiency and resource utilization. In some examples, the link establishment manager 925 may determine that the first flow is not admissible based on receiving a number of negative acknowledgments that is greater than or equal to the threshold number of negative acknowledgments. In some examples, the link establishment manager 925 may discontinue the monitoring and the transmitting the first data flow based on the determining that the first flow is not admissible.

In some cases, the predetermined number of a set of links that support a data flow for a connection-based multicast sidelink communication is based on a predetermined percentage of the set of links that have a link quality that supports the quality of service associated with the first data flow. In some cases, the predetermined percentage is based on the quality of service associated with the first data flow.

The system resource component 935 may determine channel resource requirements for the first data flow based on one or more of an amount of resources required to provide the quality of service associated with the first data flow, a data rate of the first data flow, a priority of the first data flow, an anticipated number of retransmissions associated with the first data flow, or any combinations thereof.

In some examples, the system resource component 935 may determine an average resource availability for transmissions of the first data flow based on a channel busy ratio associated with a first link between the first UE and at least the second UE. In some examples, the system resource component 935 may determine a system resource availability associated with the first link, and where the establishing the first data flow with the second UE is further based on the system resource availability.

In some examples, the system resource component 935 may determine channel resource requirements for the first data flow based on one or more of an amount of resources required to provide the quality of service associated with the first data flow, a data rate associated with the first data flow, a priority of the first data flow, an anticipated number of retransmissions associated with the first data flow, or any combinations thereof. In some examples, the system resource component 935 may determine an average resource availability for transmissions of the first data flow based on a channel busy ratio associated with the first link.

In some examples, the system resource component 935 may determine that the average resource availability for transmission of the first data flow meets or exceeds channel resource requirements to meet the quality of service associated with the first data flow. In some examples, the system resource component 935 may determine a channel congestion associated with each of the set of links, and where the link quality for each of the set of links is further based on the channel congestion associated with each of the set of links.

In some examples, the system resource component 935 may determine a first set of resources for transmission of the first data flow. In some examples, the system resource component 935 may determine a second set of resources allocated for one or more transmissions or receptions of the one or more other data flows of the first UE. In some examples, the system resource component 935 may determine that the first set of resources can be multiplexed around the second set of resources. In some examples, the system resource component 935 may determine, prior to determining that the first set of resources can be multiplexed around the second set of resources, that the first set of resources cannot be multiplexed around the second set of resources and maintain the quality of service. In some examples, the system resource component 935 may discontinue, prior to determining that the first set of resources can be multiplexed around the second set of resources, the determining that the first UE can support the first data flow.

In some examples, the system resource component 935 may determine a channel congestion associated with a wireless channel that is to be used for transmitting the broadcast communications, and where the transmitting the broadcast communications of the first data flow is further based on the channel congestion associated with the wireless channel. In some examples, the system resource component 935 may determine a channel busy ratio associated with the wireless channel.

In some cases, the average resource availability is further determined based on one or more of a channel quality of the first link, one or more other links that are multiplexed on the first link, a radio resource control configuration of the first link, the priority of the first data flow, or any combinations thereof. In some cases, the average resource availability is determined based on a mapping between a channel resource availability table and one or more of the priority of the first data flow or the channel busy ratio associated with the first link. In some cases, the channel resource availability table indicates, for a set channel resource requirements, whether resources are available or not for a set of combinations of priorities of data flows and channel busy ratios. In some cases, the channel resource availability table is periodically updated based on channel busy ratio measurements of the first UE. In some cases, the channel resource availability table is further mapped to packet delay budgets associated with the first data flow, and indicates whether resources are available or not for a set of combinations of priorities of data flows, channel busy ratios, and packet delay budgets.

The link quality component 930 may estimate the channel quality of the first link based on one or more of a channel quality index of the first link, a link spectral efficiency of the first link, a rank indicator of the first link, or a precoding matrix indicator of the first link.

In some examples, the link quality component 930 may estimate the channel quality of each of the set of links based on one or more of a channel quality index, a link spectral efficiency, a rank indicator, or a precoding matrix indicator associated with each of the set of links.

The reference signal manager 940 may transmit a reference signal to the second UE. In some examples, the reference signal manager 940 may receive a measurement report from the second UE, and where the channel quality of the first link is based on the measurement report.

In some examples, the reference signal manager 940 may transmit a reference signal to each of the set of other UEs. In some examples, the reference signal manager 940 may receive a set of measurement reports from the set of other UEs, and where the link quality for each of the set of links is determined based on the corresponding measurement report.

In some examples, the reference signal manager 940 of a second UE may transmit a reference signal to the first UE. In some examples, the reference signal manager 940 may receive a CSI report from the first UE and one or more of a time availability or peak throughput of the first UE. In some examples, the reference signal manager 940 may determine that the first link can support the first data flow based on the CSI report, the time availability or peak throughput of the first UE, and one or more other data flows of the second UE that are to be multiplexed with the first data flow. In some examples, the reference signal manager 940 may transmit an indication to the first UE that the second UE can support the first data flow via the first link.

In some cases, the measurement report indicates one or more of a channel quality index, a link spectral efficiency that can be supported by the first link, a rank indication of the first link, a precoding matrix index of the first link, or any combinations thereof.

The pseudo resource selection component 945 may identify a number of uplink resources that may be used based on multiple possible arrival times of data for the data flow. In some cases, the average resource availability is determined based on a likelihood of first link resource availability at two or more possible data arrival times of the first data flow. In some cases, the likelihood of first link resource availability at the two or more possible data arrival times is determined based on a medium access control (MAC) layer pseudo-resource selection for the first data flow based on the two or more possible data arrival times. In some cases, the MAC layer pseudo-resource selection is used to evaluate multiple data arrival times within a resource reservation interval and determine, for each of the multiple data arrival times whether resources for the first data flow are available or unavailable. In some cases, the first UE determines that the average resource availability is sufficient to meet the channel resource requirements based on a percentage of the multiple data arrival times that have available resources for the first data flow exceeding a threshold percentage value.

Figure 10:
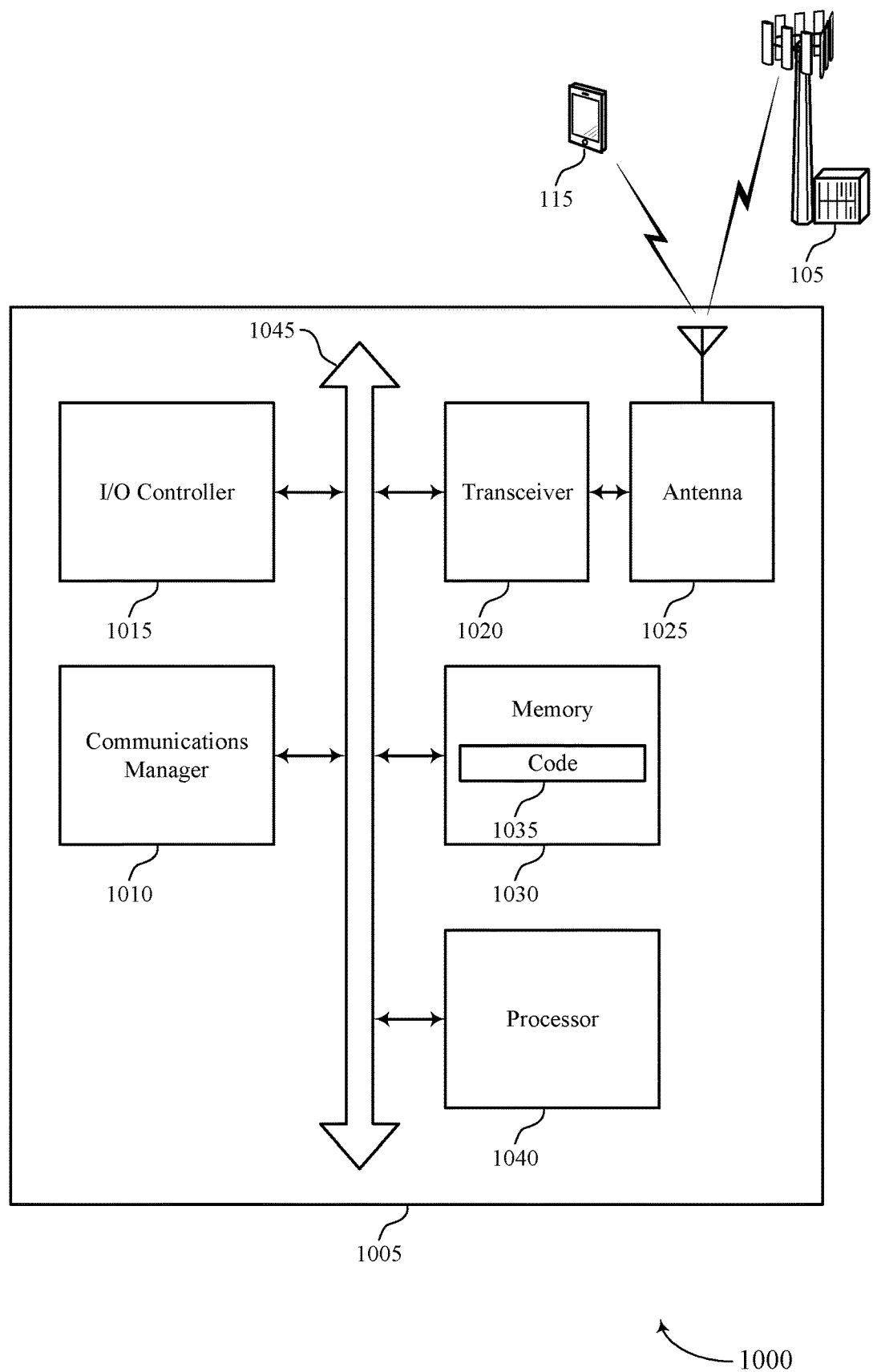
FIG. 10 shows a diagram of a system including a device that supports techniques for controlling admission for sidelink communications in accordance with aspects of the present disclosure.

FIG. 10 shows a diagram of a system 1000 including a device 1005 that supports techniques for controlling admission for sidelink communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive an indication that a first data flow is to be initiated in a device-to-device sidelink connection between a first UE and a second UE, identify a quality of service associated with the first data flow, determine that a first link between the first UE and the second UE can support the first data flow based on the quality of service associated with the first data flow and an available throughput of the first link, where the available throughput of the first link is based on multiplexing the first link with one or more other links of the first UE, and establish the first data flow with the second UE based on the determination.

The communications manager 1010 may also receive an indication that a first data flow is to be initiated in a multicast device-to-device sidelink connection between the first UE and a set of other UEs, where the first UE has a set of links that each correspond to a respective second UE of the set of other UEs, identify a quality of service associated with the first data flow, determine a link quality for each of the set of links, each link quality determined based on a corresponding channel quality and available channel throughput associated with the corresponding link of the set of links, and establish the first data flow with the set of other UEs based on at least a predetermined number of the set of links having a link quality that supports the quality of service associated with the first data flow.

The communications manager 1010 may also receive an indication that a first data flow is to be initiated in a multicast device-to-device sidelink connection between the first UE and a set of other UEs, identify a quality of service associated with the first data flow, transmit a test communication to the set of other UEs based on the quality of service associated with the first data flow, monitor for one or more negative acknowledgments from one or more of the set of other UEs, and transmit the first data flow based on receiving fewer than a threshold number of negative acknowledgments associated with the test communication.

The communications manager 1010 may also receive an indication that a first data flow is to be initiated in a broadcast device-to-device sidelink connection between the first UE and a set of other UEs, identify a quality of service associated with the first data flow, determine that the first UE can support the first data flow based on the quality of service associated with the first data flow and an available throughput of broadcast transmissions based on multiplexing the first data flow with transmissions of one or more other data flows of the first UE, and transmit broadcast communications of the first data flow based on the determining.

The communications manager 1010 may also receive an indication that a first data flow is to be initiated in a device-to-device sidelink connection between the first UE and at least a second UE, identify a quality of service associated with the first data flow, determine channel resource requirements for the first data flow based on one or more of an amount of resources required to provide the quality of service associated with the first data flow, a data rate of the first data flow, a priority of the first data flow, an anticipated number of retransmissions associated with the first data flow, or any combinations thereof, determine an average resource availability for transmissions of the first data flow based on a channel busy ratio associated with a first link between the first UE and at least the second UE, and establish the first data flow with the second UE based on the average resource availability being sufficient to meet the channel resource requirements.

The communications manager 1010 may also receive, at a second UE, an indication from a first UE that a first data flow is to be initiated in a device-to-device sidelink connection between the first UE and the second UE, receive signaling from the first UE to establish the first data flow with the first UE, determine a channel quality of a first link between the first UE and the second UE, and transmit a report to the first UE that indicates the channel quality of the first link and a schedule of the second UE.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for controlling admission for sidelink communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
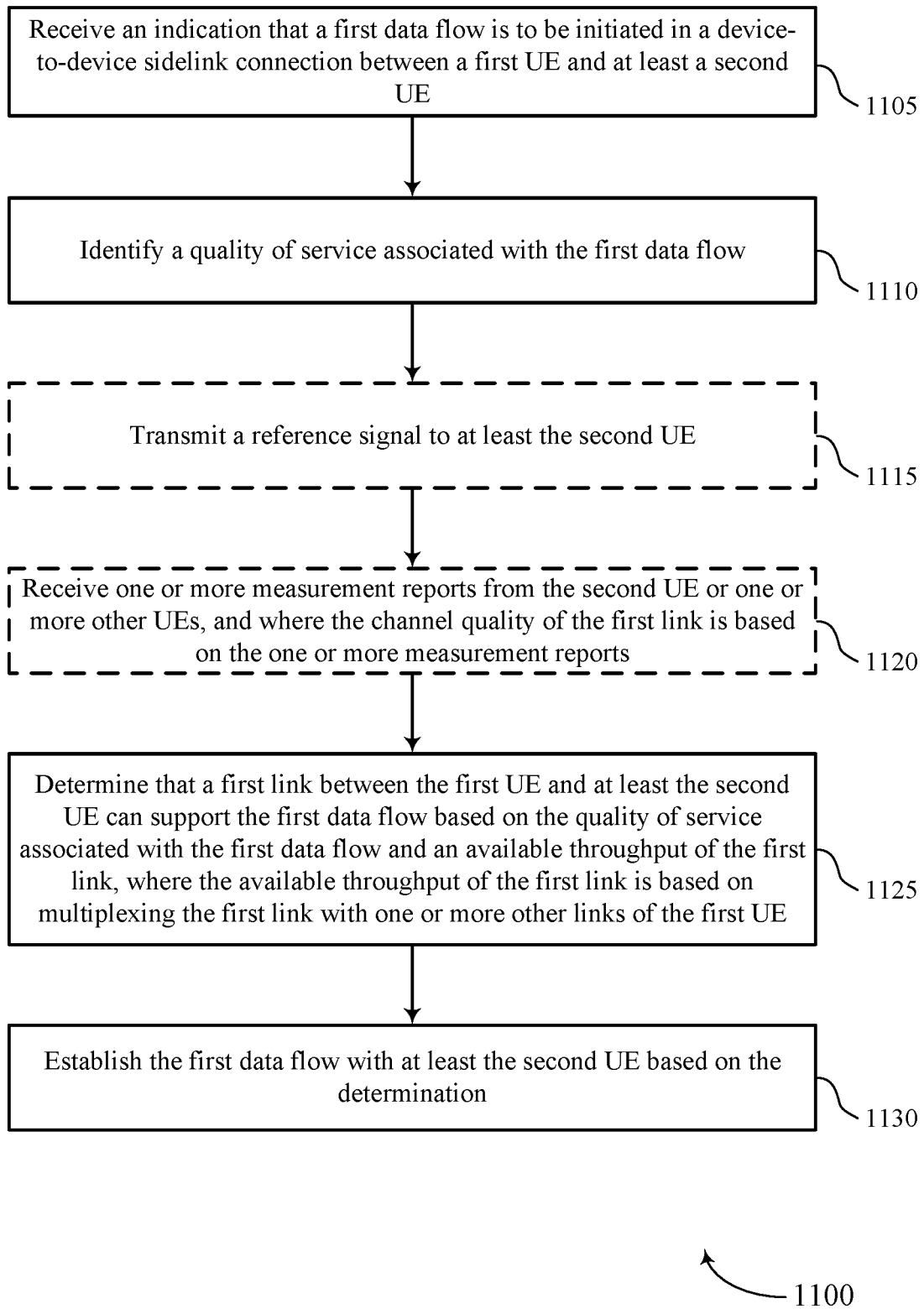
FIGS. 11 through 19 show flowcharts illustrating methods that support techniques for controlling admission for sidelink communications in accordance with aspects of the present disclosure.

FIG. 11 shows a flowchart illustrating a method 1100 that supports techniques for controlling admission for sidelink communications in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may receive an indication that a first data flow is to be initiated in a device-to-device sidelink connection between a first UE and at least a second UE. The operations of 1105 may be performed according to the methods described herein. In some examples, aspects of the operations of 1105 may be performed by a sidelink data manager as described with reference to FIGS. 7 through 10.

At 1110, the UE may identify a quality of service associated with the first data flow. The operations of 1110 may be performed according to the methods described herein. In some examples, aspects of the operations of 1110 may be performed by a sidelink QoS manager as described with reference to FIGS. 7 through 10.

Optionally, at 1115, the UE may transmit a reference signal to at least the second UE. The operations of 1115 may be performed according to the methods described herein. In some examples, aspects of the operations of 1115 may be performed by a reference signal manager as described with reference to FIGS. 7 through 10.

Optionally, at 1120, the UE may receive one or more measurement reports from the second UE or one or more other UEs, and where the channel quality of the first link is based on the one or more measurement reports. The operations of 1120 may be performed according to the methods described herein. In some examples, aspects of the operations of 1120 may be performed by a reference signal manager as described with reference to FIGS. 7 through 10.

At 1125, the UE may determine that a first link between the first UE and at least the second UE can support the first data flow based on the quality of service associated with the first data flow and an available throughput of the first link, where the available throughput of the first link is based on multiplexing the first link with one or more other links of the first UE. The operations of 1125 may be performed according to the methods described herein. In some examples, aspects of the operations of 1125 may be performed by a link evaluation manager as described with reference to FIGS. 7 through 10.

At 1130, the UE may establish the first data flow with at least the second UE based on the determination. The operations of 1130 may be performed according to the methods described herein. In some examples, aspects of the operations of 1130 may be performed by a link establishment manager as described with reference to FIGS. 7 through 10.

Figure 12:
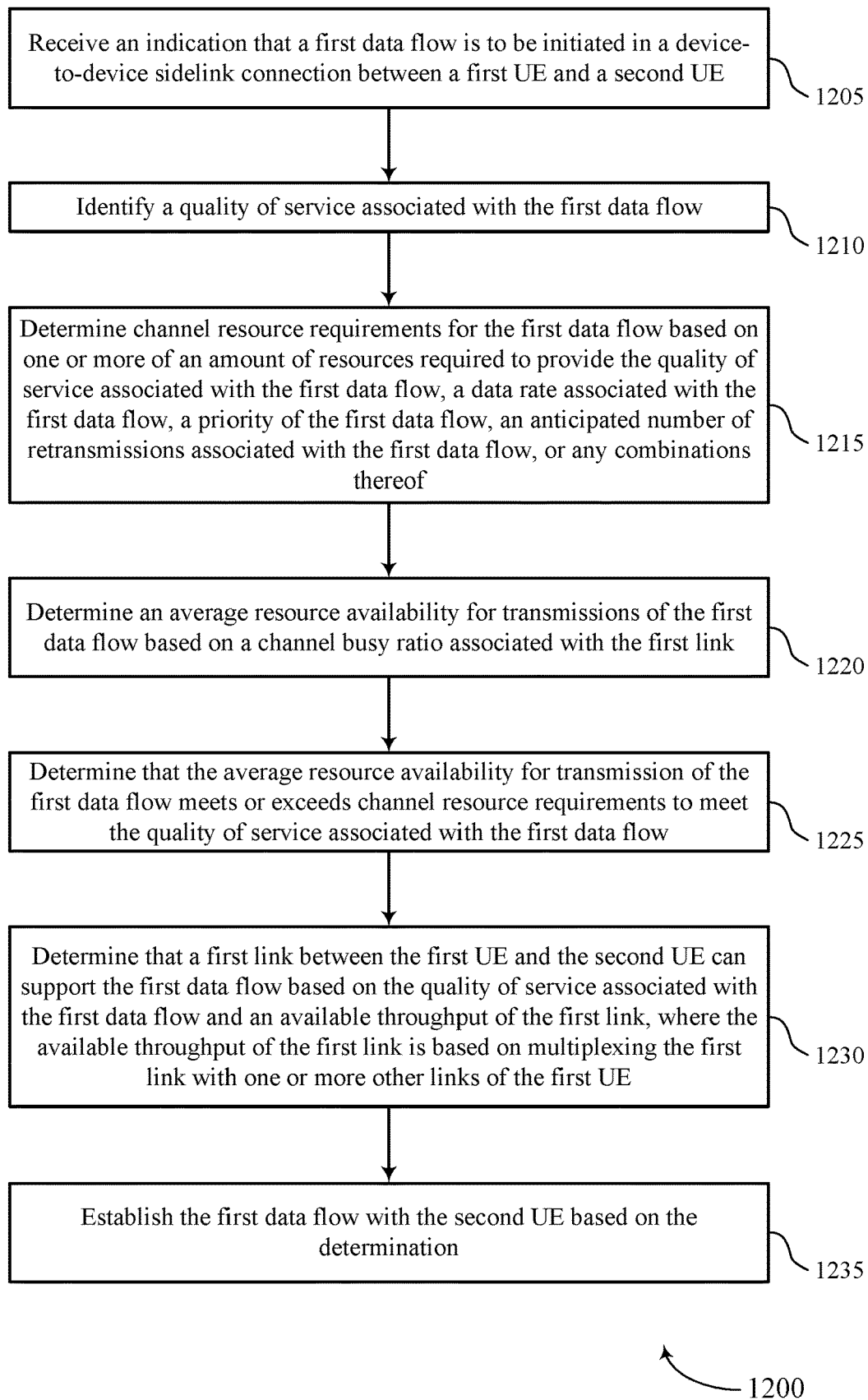

FIG. 12 shows a flowchart illustrating a method 1200 that supports techniques for controlling admission for sidelink communications in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may receive an indication that a first data flow is to be initiated in a device-to-device sidelink connection between a first UE and a second UE. The operations of 1205 may be performed according to the methods described herein. In some examples, aspects of the operations of 1205 may be performed by a sidelink data manager as described with reference to FIGS. 7 through 10.

At 1210, the UE may identify a quality of service associated with the first data flow. The operations of 1210 may be performed according to the methods described herein. In some examples, aspects of the operations of 1210 may be performed by a sidelink QoS manager as described with reference to FIGS. 7 through 10.

At 1215, the UE may determine channel resource requirements for the first data flow based on one or more of an amount of resources required to provide the quality of service associated with the first data flow, a data rate associated with the first data flow, a priority of the first data flow, an anticipated number of retransmissions associated with the first data flow, or any combinations thereof. The operations of 1215 may be performed according to the methods described herein. In some examples, aspects of the operations of 1215 may be performed by a system resource component as described with reference to FIGS. 7 through 10.

At 1220, the UE may determine an average resource availability for transmissions of the first data flow based on a channel busy ratio associated with the first link. The operations of 1220 may be performed according to the methods described herein. In some examples, aspects of the operations of 1220 may be performed by a system resource component as described with reference to FIGS. 7 through 10.

At 1225, the UE may determine that the average resource availability for transmission of the first data flow meets or exceeds channel resource requirements to meet the quality of service associated with the first data flow. The operations of 1225 may be performed according to the methods described herein. In some examples, aspects of the operations of 1225 may be performed by a system resource component as described with reference to FIGS. 7 through 10.

At 1230, the UE may determine that a first link between the first UE and the second UE can support the first data flow based on the quality of service associated with the first data flow and an available throughput of the first link, where the available throughput of the first link is based on multiplexing the first link with one or more other links of the first UE. The operations of 1230 may be performed according to the methods described herein. In some examples, aspects of the operations of 1230 may be performed by a link evaluation manager as described with reference to FIGS. 7 through 10.

At 1235, the UE may establish the first data flow with the second UE based on the determination. The operations of 1235 may be performed according to the methods described herein. In some examples, aspects of the operations of 1235 may be performed by a link establishment manager as described with reference to FIGS. 7 through 10.

Figure 13:
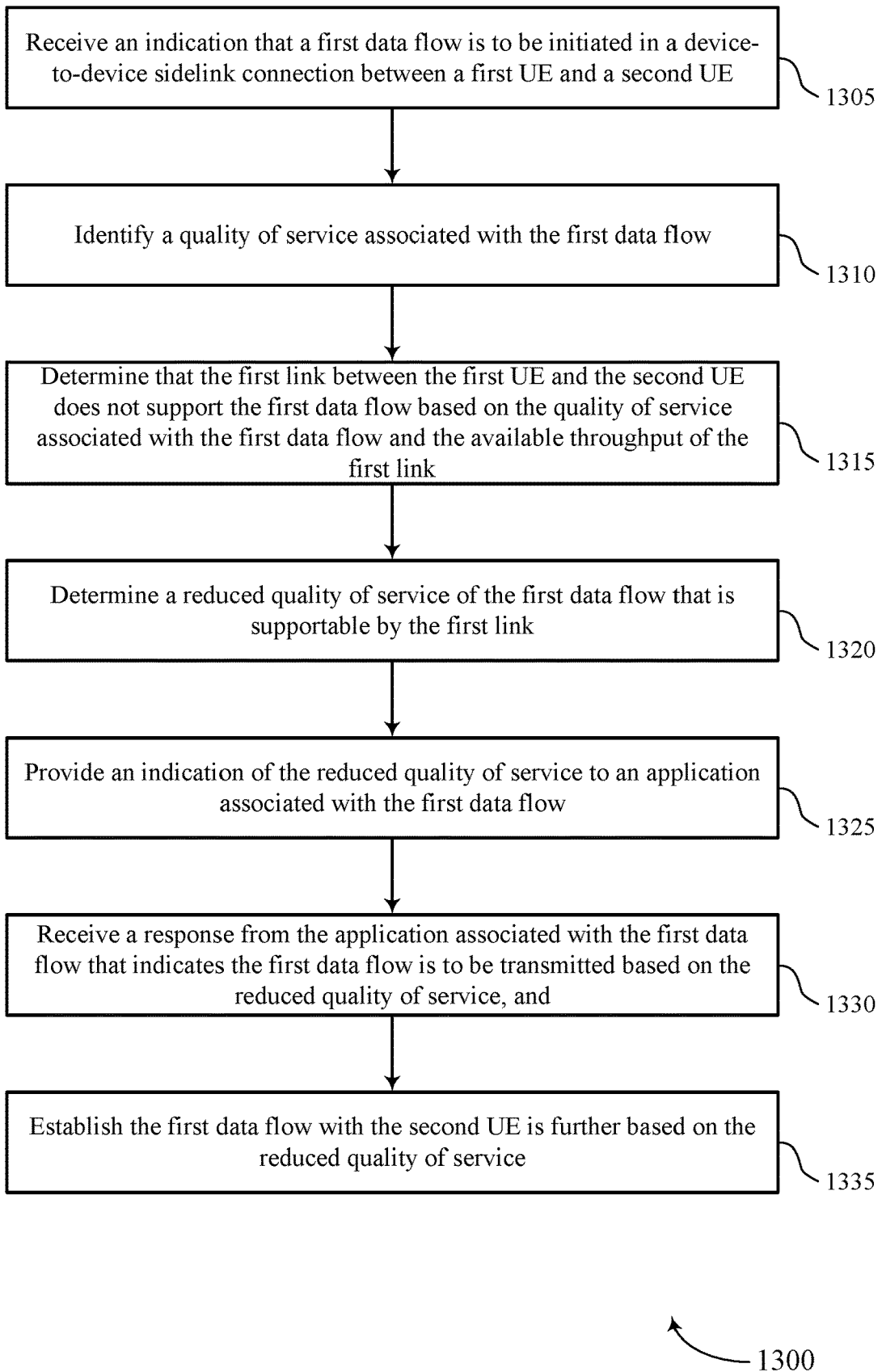

FIG. 13 shows a flowchart illustrating a method 1300 that supports techniques for controlling admission for sidelink communications in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may receive an indication that a first data flow is to be initiated in a device-to-device sidelink connection between a first UE and a second UE. The operations of 1305 may be performed according to the methods described herein. In some examples, aspects of the operations of 1305 may be performed by a sidelink data manager as described with reference to FIGS. 7 through 10.

At 1310, the UE may identify a quality of service associated with the first data flow. The operations of 1310 may be performed according to the methods described herein. In some examples, aspects of the operations of 1310 may be performed by a sidelink QoS manager as described with reference to FIGS. 7 through 10.

At 1315, the UE may determine that the first link between the first UE and the second UE does not support the first data flow based on the quality of service associated with the first data flow and the available throughput of the first link. The operations of 1315 may be performed according to the methods described herein. In some examples, aspects of the operations of 1315 may be performed by a link establishment manager as described with reference to FIGS. 7 through 10.

At 1320, the UE may determine a reduced quality of service of the first data flow that is supportable by the first link. The operations of 1320 may be performed according to the methods described herein. In some examples, aspects of the operations of 1320 may be performed by a sidelink QoS manager as described with reference to FIGS. 7 through 10.

At 1325, the UE may provide an indication of the reduced quality of service to an application associated with the first data flow. The operations of 1325 may be performed according to the methods described herein. In some examples, aspects of the operations of 1325 may be performed by a sidelink QoS manager as described with reference to FIGS. 7 through 10.

At 1330, the UE may receive a response from the application associated with the first data flow that indicates the first data flow is to be transmitted based on the reduced quality of service. The operations of 1330 may be performed according to the methods described herein. In some examples, aspects of the operations of 1330 may be performed by a sidelink QoS manager as described with reference to FIGS. 7 through 10.

At 1335, the UE may establish the first data flow with the second UE based on the reduced quality of service. The operations of 1335 may be performed according to the methods described herein. In some examples, aspects of the operations of 1335 may be performed by a sidelink QoS manager as described with reference to FIGS. 7 through 10.

Figure 14:
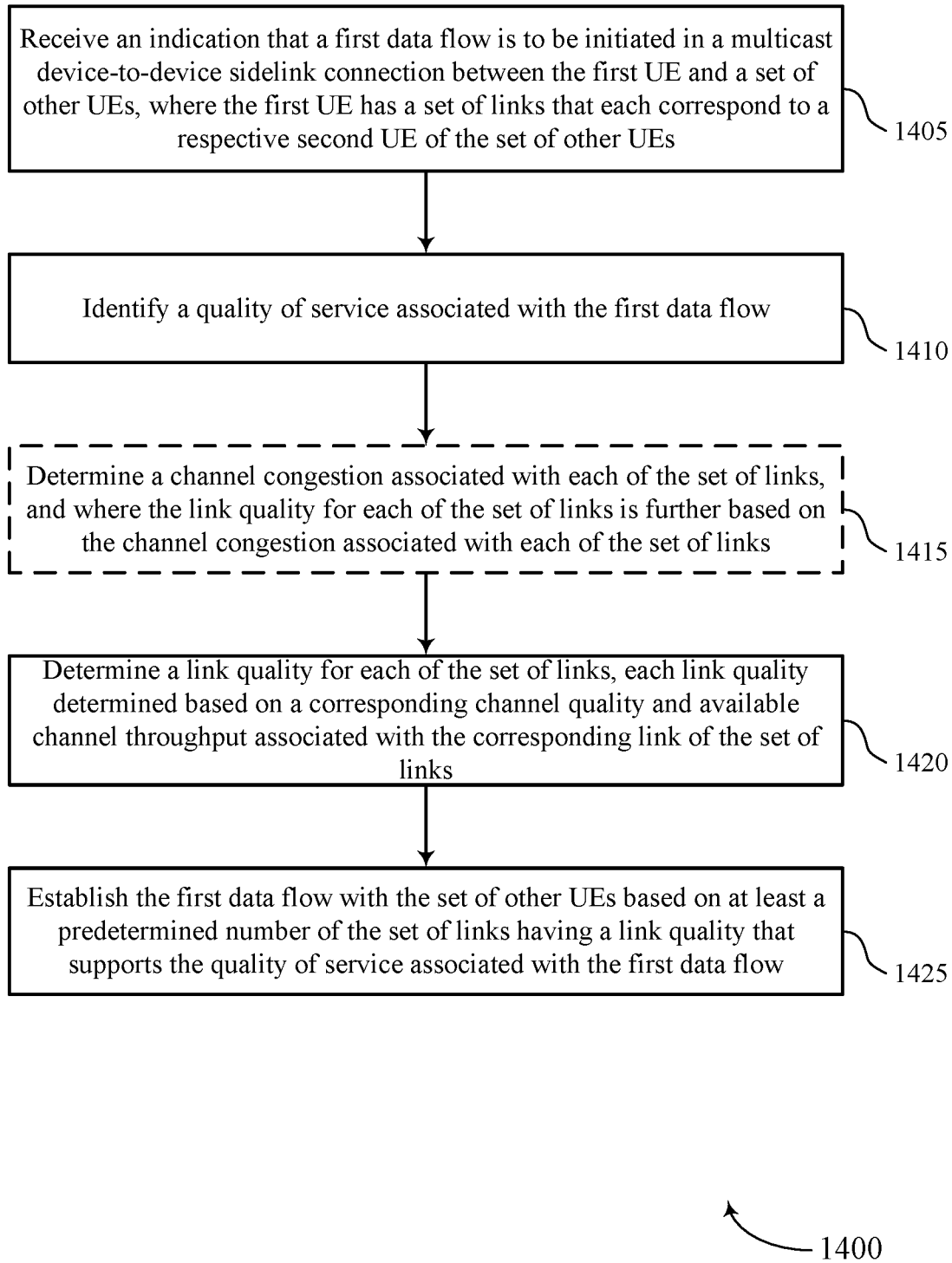

FIG. 14 shows a flowchart illustrating a method 1400 that supports techniques for controlling admission for sidelink communications in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1405, the UE may receive an indication that a first data flow is to be initiated in a multicast device-to-device sidelink connection between the first UE and a set of other UEs, where the first UE has a set of links that each correspond to a respective second UE of the set of other UEs. The operations of 1405 may be performed according to the methods described herein. In some examples, aspects of the operations of 1405 may be performed by a sidelink data manager as described with reference to FIGS. 7 through 10.

At 1410, the UE may identify a quality of service associated with the first data flow. The operations of 1410 may be performed according to the methods described herein. In some examples, aspects of the operations of 1410 may be performed by a sidelink QoS manager as described with reference to FIGS. 7 through 10.

Optionally, at 1415, the UE may determine a channel congestion associated with each of the set of links, and where the link quality for each of the set of links is further based on the channel congestion associated with each of the set of links. The operations of 1415 may be performed according to the methods described herein. In some examples, aspects of the operations of 1415 may be performed by a system resource component as described with reference to FIGS. 7 through 10.

At 1420, the UE may determine a link quality for each of the set of links, each link quality determined based on a corresponding channel quality and available channel throughput associated with the corresponding link of the set of links. The operations of 1420 may be performed according to the methods described herein. In some examples, aspects of the operations of 1420 may be performed by a link evaluation manager as described with reference to FIGS. 7 through 10.

At 1425, the UE may establish the first data flow with the set of other UEs based on at least a predetermined number of the set of links having a link quality that supports the quality of service associated with the first data flow. The operations of 1425 may be performed according to the methods described herein. In some examples, aspects of the operations of 1425 may be performed by a link establishment manager as described with reference to FIGS. 7 through 10.

Figure 15:
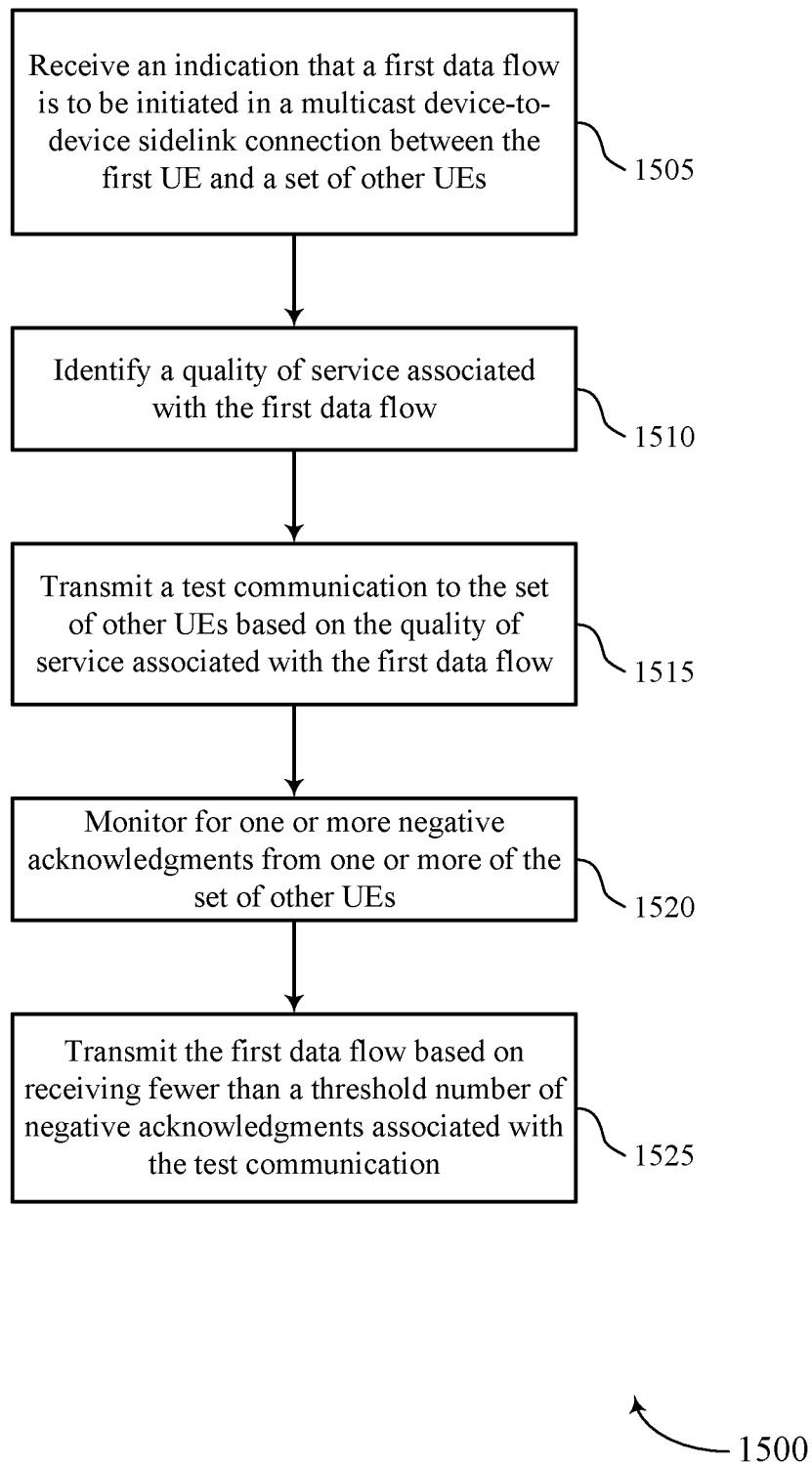

FIG. 15 shows a flowchart illustrating a method 1500 that supports techniques for controlling admission for sidelink communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive an indication that a first data flow is to be initiated in a multicast device-to-device sidelink connection between the first UE and a set of other UEs. The operations of 1505 may be performed according to the methods described herein. In some examples, aspects of the operations of 1505 may be performed by a sidelink data manager as described with reference to FIGS. 7 through 10.

At 1510, the UE may identify a quality of service associated with the first data flow. The operations of 1510 may be performed according to the methods described herein. In some examples, aspects of the operations of 1510 may be performed by a sidelink QoS manager as described with reference to FIGS. 7 through 10.

At 1515, the UE may transmit a test communication to the set of other UEs based on the quality of service associated with the first data flow. The operations of 1515 may be performed according to the methods described herein. In some examples, aspects of the operations of 1515 may be performed by a link evaluation manager as described with reference to FIGS. 7 through 10.

At 1520, the UE may monitor for one or more negative acknowledgments from one or more of the set of other UEs. The operations of 1520 may be performed according to the methods described herein. In some examples, aspects of the operations of 1520 may be performed by a link evaluation manager as described with reference to FIGS. 7 through 10.

At 1525, the UE may transmit the first data flow based on receiving fewer than a threshold number of negative acknowledgments associated with the test communication. The operations of 1525 may be performed according to the methods described herein. In some examples, aspects of the operations of 1525 may be performed by a link establishment manager as described with reference to FIGS. 7 through 10.

Figure 16:
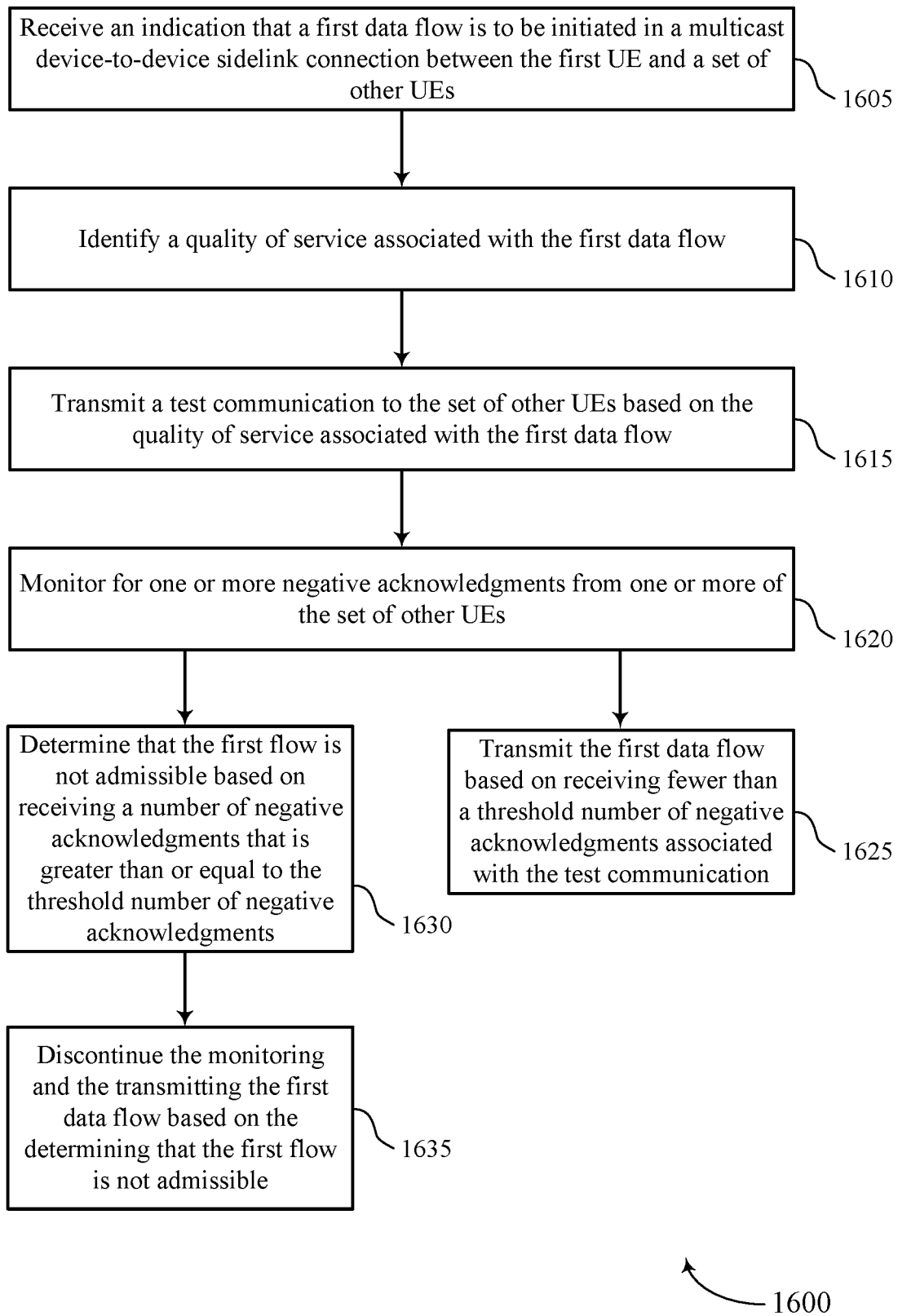

FIG. 16 shows a flowchart illustrating a method 1600 that supports techniques for controlling admission for sidelink communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive an indication that a first data flow is to be initiated in a multicast device-to-device sidelink connection between the first UE and a set of other UEs. The operations of 1605 may be performed according to the methods described herein. In some examples, aspects of the operations of 1605 may be performed by a sidelink data manager as described with reference to FIGS. 7 through 10.

At 1610, the UE may identify a quality of service associated with the first data flow. The operations of 1610 may be performed according to the methods described herein. In some examples, aspects of the operations of 1610 may be performed by a sidelink QoS manager as described with reference to FIGS. 7 through 10.

At 1615, the UE may transmit a test communication to the set of other UEs based on the quality of service associated with the first data flow. The operations of 1615 may be performed according to the methods described herein. In some examples, aspects of the operations of 1615 may be performed by a link evaluation manager as described with reference to FIGS. 7 through 10.

At 1620, the UE may monitor for one or more negative acknowledgments from one or more of the set of other UEs. The operations of 1620 may be performed according to the methods described herein. In some examples, aspects of the operations of 1620 may be performed by a link evaluation manager as described with reference to FIGS. 7 through 10.

At 1625, if fewer than a threshold number of negative acknowledgments are received, the UE may transmit the first data flow based on receiving fewer than a threshold number of negative acknowledgments associated with the test communication. The operations of 1625 may be performed according to the methods described herein. In some examples, aspects of the operations of 1625 may be performed by a link establishment manager as described with reference to FIGS. 7 through 10.

Alternatively, at 1630, if a threshold number of negative acknowledgments are received, the UE may determine that the first flow is not admissible based on receiving a number of negative acknowledgments that is greater than or equal to the threshold number of negative acknowledgments. The operations of 1630 may be performed according to the methods described herein. In some examples, aspects of the operations of 1630 may be performed by a link establishment manager as described with reference to FIGS. 7 through 10.

At 1635, the UE may discontinue the monitoring and the transmitting the first data flow based on the determining that the first flow is not admissible. The operations of 1635 may be performed according to the methods described herein. In some examples, aspects of the operations of 1635 may be performed by a link establishment manager as described with reference to FIGS. 7 through 10.

Figure 17:
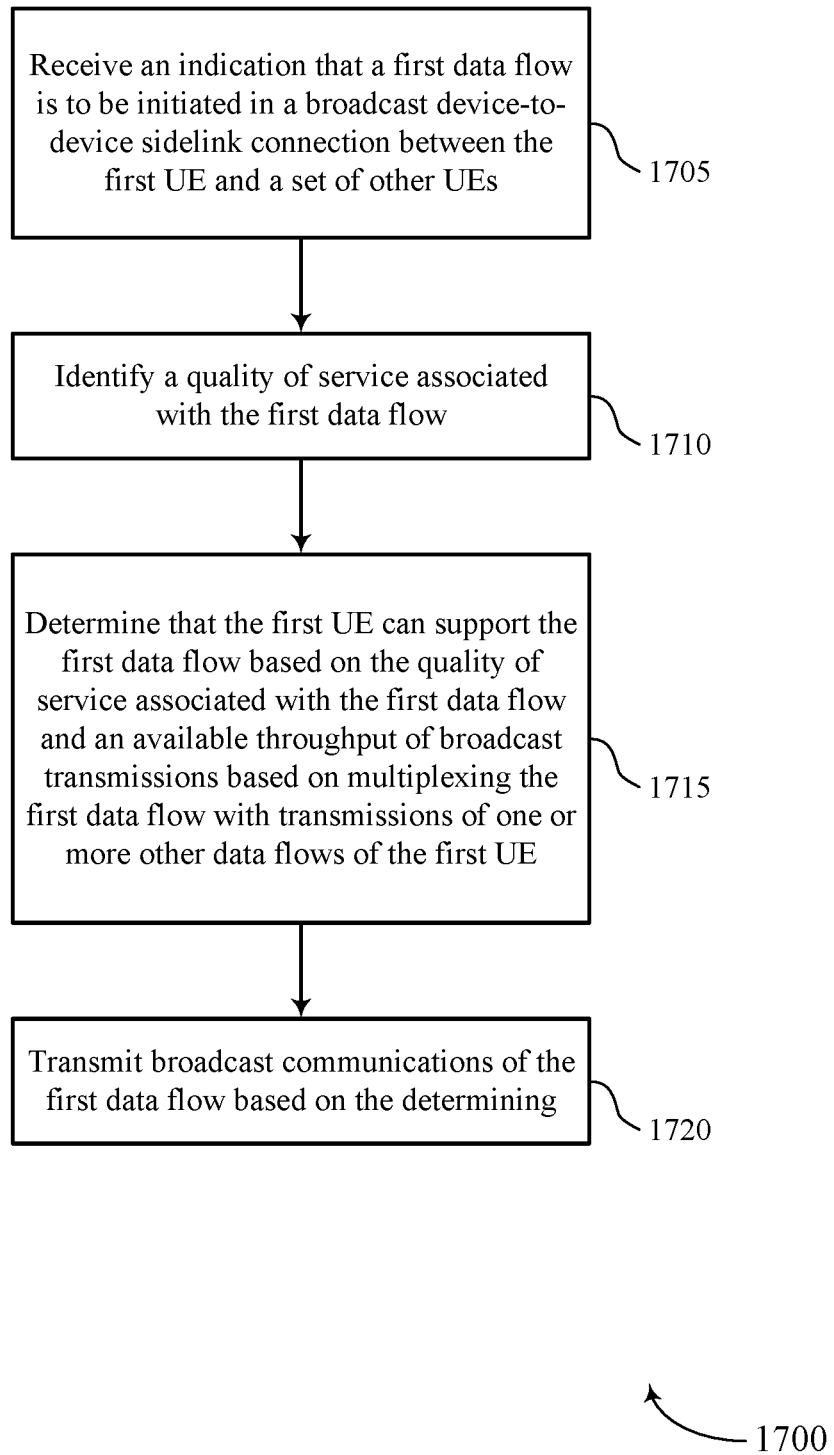

FIG. 17 shows a flowchart illustrating a method 1700 that supports techniques for controlling admission for sidelink communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive an indication that a first data flow is to be initiated in a broadcast device-to-device sidelink connection between the first UE and a set of other UEs. The operations of 1705 may be performed according to the methods described herein. In some examples, aspects of the operations of 1705 may be performed by a sidelink data manager as described with reference to FIGS. 7 through 10.

At 1710, the UE may identify a quality of service associated with the first data flow. The operations of 1710 may be performed according to the methods described herein. In some examples, aspects of the operations of 1710 may be performed by a sidelink QoS manager as described with reference to FIGS. 7 through 10.

At 1715, the UE may determine that the first UE can support the first data flow based on the quality of service associated with the first data flow and an available throughput of broadcast transmissions based on multiplexing the first data flow with transmissions of one or more other data flows of the first UE. The operations of 1715 may be performed according to the methods described herein. In some examples, aspects of the operations of 1715 may be performed by a link evaluation manager as described with reference to FIGS. 7 through 10.

At 1720, the UE may transmit broadcast communications of the first data flow based on the determining. The operations of 1720 may be performed according to the methods described herein. In some examples, aspects of the operations of 1720 may be performed by a link establishment manager as described with reference to FIGS. 7 through 10.

Figure 18:
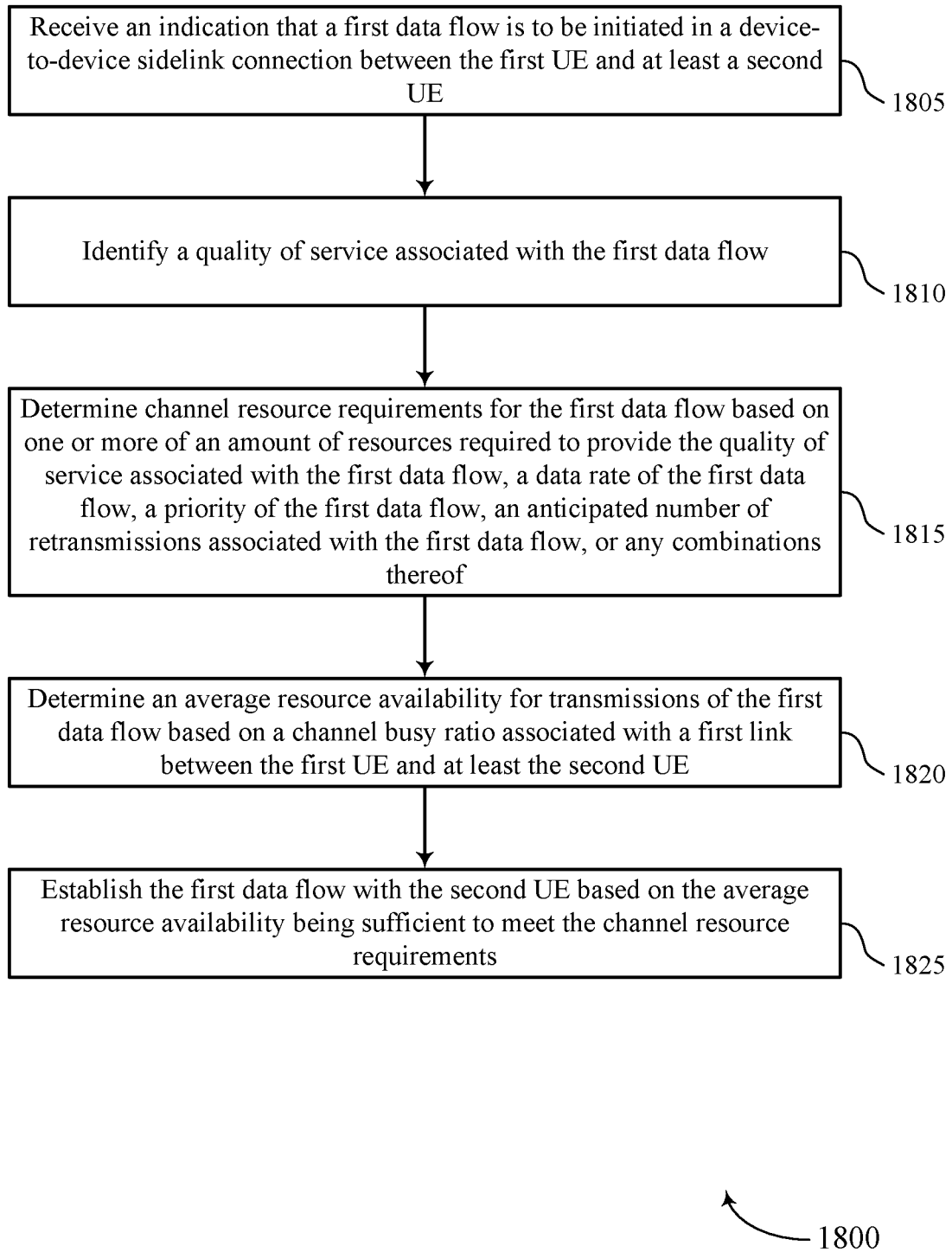

FIG. 18 shows a flowchart illustrating a method 1800 that supports techniques for controlling admission for sidelink communications in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive an indication that a first data flow is to be initiated in a device-to-device sidelink connection between the first UE and at least a second UE. The operations of 1805 may be performed according to the methods described herein. In some examples, aspects of the operations of 1805 may be performed by a sidelink data manager as described with reference to FIGS. 7 through 10.

At 1810, the UE may identify a quality of service associated with the first data flow. The operations of 1810 may be performed according to the methods described herein. In some examples, aspects of the operations of 1810 may be performed by a sidelink QoS manager as described with reference to FIGS. 7 through 10.

At 1815, the UE may determine channel resource requirements for the first data flow based on one or more of an amount of resources required to provide the quality of service associated with the first data flow, a data rate of the first data flow, a priority of the first data flow, an anticipated number of retransmissions associated with the first data flow, or any combinations thereof. The operations of 1815 may be performed according to the methods described herein. In some examples, aspects of the operations of 1815 may be performed by a system resource component as described with reference to FIGS. 7 through 10.

At 1820, the UE may determine an average resource availability for transmissions of the first data flow based on a channel busy ratio associated with a first link between the first UE and at least the second UE. The operations of 1820 may be performed according to the methods described herein. In some examples, aspects of the operations of 1820 may be performed by a system resource component as described with reference to FIGS. 7 through 10.

At 1825, the UE may establish the first data flow with the second UE based on the average resource availability being sufficient to meet the channel resource requirements. The operations of 1825 may be performed according to the methods described herein. In some examples, aspects of the operations of 1825 may be performed by a link establishment manager as described with reference to FIGS. 7 through 10.

Figure 19:
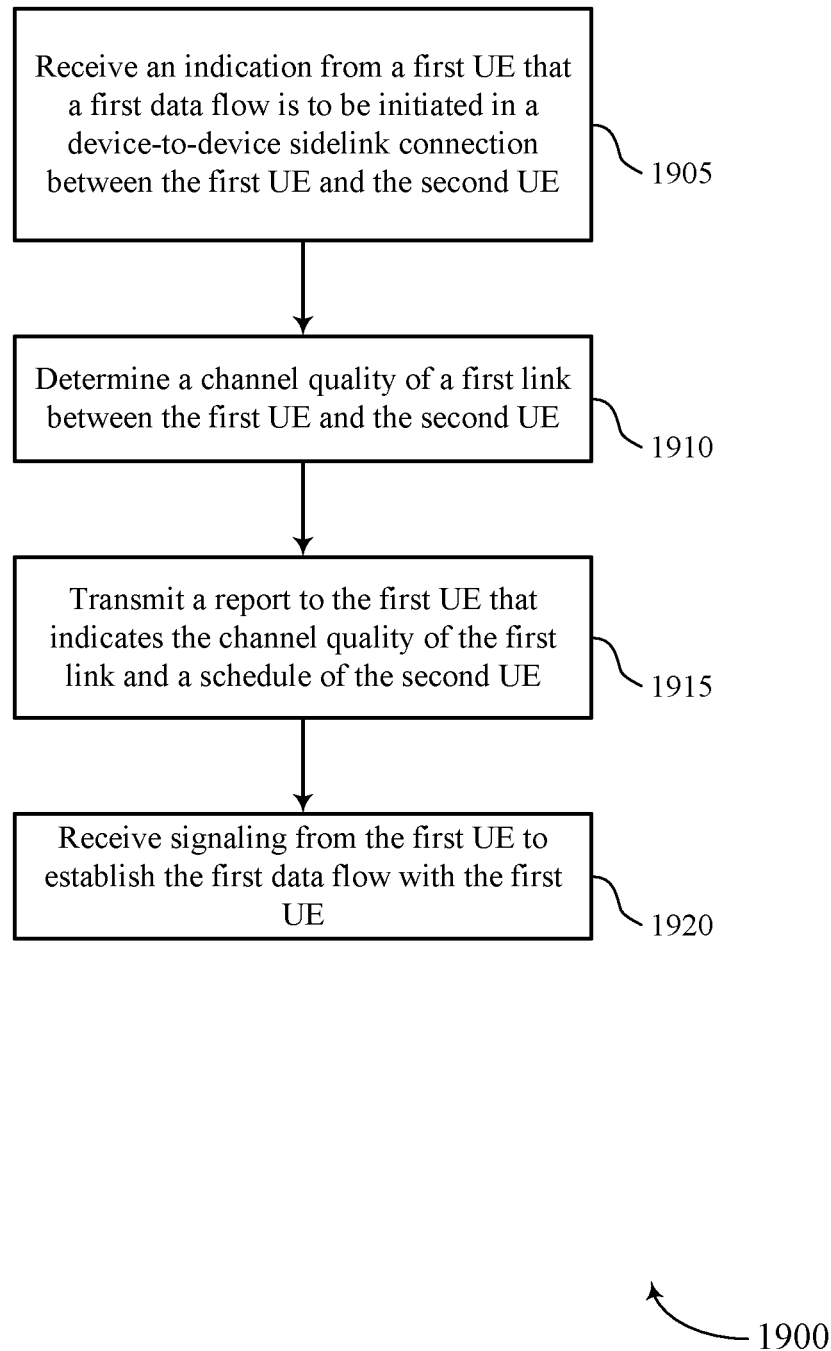

FIG. 19 shows a flowchart illustrating a method 1900 that supports techniques for controlling admission for sidelink communications in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may be a second UE and may receive an indication from a first UE that a first data flow is to be initiated in a device-to-device sidelink connection between the first UE and the second UE. The operations of 1905 may be performed according to the methods described herein. In some examples, aspects of the operations of 1905 may be performed by a link establishment manager as described with reference to FIGS. 7 through 10.

At 1910, the UE may determine a channel quality of a first link between the first UE and the second UE. The operations of 1910 may be performed according to the methods described herein. In some examples, aspects of the operations of 1910 may be performed by a link evaluation manager as described with reference to FIGS. 7 through 10.

At 1915, the UE may transmit a report to the first UE that indicates the channel quality of the first link and a schedule of the second UE. The operations of 1915 may be performed according to the methods described herein. In some examples, aspects of the operations of 1915 may be performed by a link evaluation manager as described with reference to FIGS. 7 through 10.

At 1920, the UE may receive signaling from the first UE to establish the first data flow with the first UE. The operations of 1920 may be performed according to the methods described herein. In some examples, aspects of the operations of 1920 may be performed by a link establishment manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving an indication that a first data flow is to be initiated in a device-to-device sidelink connection between a first UE and at least a second UE;
identifying a quality of service associated with the first data flow;
determining that a first link between the first UE and at least the second UE can support the first data flow based at least in part on the quality of service associated with the first data flow, available resources associated with the first link, a channel quality of the first link, and an available throughput of the first link, wherein the available throughput of the first link is based at least in part on time-division multiplexing the first link with one or more other links between the first UE and one or more of a network entity or one or more other UEs; and
establishing the first data flow with at least the second UE based at least in part on the determination.

2. The method of claim 1, wherein:
the device-to-device sidelink connection is a unicast connection between the first UE and the second UE, is a connection-based multicast device-to-device sidelink connection between the first UE and a plurality of other UEs, or a broadcast device-to-device sidelink connection between the first UE and a plurality of other UEs.

3. The method of claim 1, wherein the determining that the first link can support the first data flow further comprises:
estimating the channel quality of the first link based at least in part on one or more of a channel quality index of the first link, a link spectral efficiency of the first link, a rank indicator of the first link, or a precoding matrix indicator of the first link.

4. The method of claim 1, wherein the quality of service associated with the first data flow is based at least in part on one or more of a priority of data to be transmitted using the first data flow, a minimum data rate associated with the first data flow, a packet delay budget associated with the first data flow, or reliability associated with the first data flow.

5. The method of claim 1, further comprising:
determining a system resource availability associated with the first link, and wherein the establishing the first data flow with at least the second UE is further based at least in part on the system resource availability.

6. The method of claim 5, wherein the determining the system resource availability comprises:
determining channel resource requirements for the first data flow based at least in part on one or more of an amount of resources required to provide the quality of service associated with the first data flow, a data rate associated with the first data flow, a priority of the first data flow, an anticipated number of retransmissions associated with the first data flow, or any combinations thereof;
determining an average resource availability for transmissions of the first data flow based at least in part on a channel busy ratio associated with the first link; and
determining that the average resource availability for transmission of the first data flow meets or exceeds channel resource requirements to meet the quality of service associated with the first data flow.

7. The method of claim 1, wherein the determining that the first link can support the first data flow further comprises:
transmitting a reference signal to at least the second UE; and
receiving one or more measurement reports from the second UE or one or more other UEs, and wherein the channel quality of the first link is based at least in part on the one or more measurement reports.

8. The method of claim 7, wherein the one or more measurement reports indicate one or more of a channel quality index, a link spectral efficiency that can be supported by the first link, a rank indication of the first link, a precoding matrix index of the first link, or any combinations thereof.

9. The method of claim 1, wherein the determining that the first link can support the first data flow further comprises:
determining the available throughput of the first link based at least in part on multiplexing the first data flow with other scheduled communications of one or more of the first UE, the second UE, or one or more other UEs.

10. The method of claim 9, wherein the determining that the first link can support the first data flow further comprises:
determining a link quality assessment based at least in part on a channel quality of the first link and the other scheduled communications of the first UE and at least the second UE; and
determining that the first link can support the first data flow based at least in part on the link quality assessment and the quality of service of the first data flow.

11. The method of claim 1, wherein the determining that the first link can support the first data flow further comprises:
receiving a channel state information (CSI) report from at least the second UE and one or more of a time availability or peak throughput of at least the second UE; and
determining that the first link can support the first data flow based at least in part on the CSI report of at least the second UE, the time availability or peak throughput of at least the second UE, and one or more other data flows of the first UE that are to be multiplexed with the first data flow.

12. The method of claim 1, further comprising:
transmitting the quality of service of the first data flow to at least the second UE; and
receiving, from at least the second UE, an indication that the first data flow can be supported, and wherein the determining that the first link can support the first data flow is further based on the indication that at least the second UE can support the first data flow.

13. The method of claim 1, further comprising:
determining that the first link between the first UE and at least the second UE does not support the first data flow based at least in part on the quality of service associated with the first data flow and the available throughput of the first link;
determining a reduced quality of service of the first data flow that is supportable by the first link;
providing an indication of the reduced quality of service to an application associated with the first data flow;
receiving a response from the application associated with the first data flow that indicates the first data flow is to be transmitted based on the reduced quality of service; and
wherein the establishing the first data flow with at least the second UE is further based at least in part on the reduced quality of service.

14. The method of claim 1, wherein the determining that the first link can support the first data flow further comprises:
determining a link quality for each of a plurality of links with a plurality of other UEs, each link quality determined based at least in part on a corresponding channel quality and available channel throughput associated with the corresponding link of the plurality of links, and wherein the first data flow with the plurality of other UEs is established based at least in part on at least a predetermined number of the plurality of links having a link quality that supports the quality of service associated with the first data flow.

15. The method of claim 14, wherein the determining the link quality for each of the plurality of links further comprises:
   transmitting a reference signal to each of the plurality of other UEs; and
   receiving a plurality of measurement reports from the plurality of other UEs, and wherein the link quality for each of the plurality of links is determined based at least in part on the corresponding measurement report.

16. The method of claim 15, wherein the establishing the first data flow with the plurality of other UEs is based on an aggregation of the plurality of measurement reports.

17. An apparatus for wireless communication, comprising:
   a processor,
   memory coupled with the processor; and
   instructions stored in the memory and executable by the processor to cause the apparatus to:
      receive an indication that a first data flow is to be initiated in a device-to-device sidelink connection between a first UE and at least a second UE;
      identify a quality of service associated with the first data flow;
      determine that a first link between the first UE and at least the second UE can support the first data flow based at least in part on the quality of service associated with the first data flow, available resources associated with the first link, a channel quality of the first link, and an available throughput of the first link, wherein the available throughput of the first link is based at least in part on time-division multiplexing the first link with one or more other links between the first UE and one or more of a network entity or one or more other UEs; and
      establish the first data flow with at least the second UE based at least in part on the determination.

18. The apparatus of claim 17, wherein:
   the device-to-device sidelink connection is a unicast connection between the first UE and the second UE, is a connection-based multicast device-to-device sidelink connection between the first UE and a plurality of other UEs, or a broadcast device-to-device sidelink connection between the first UE and a plurality of other UEs.

19. The apparatus of claim 17, wherein the instructions are further executable by the processor to cause the apparatus to:
   estimate the channel quality of the first link based at least in part on one or more of a channel quality index of the first link, a link spectral efficiency of the first link, a rank indicator of the first link, or a precoding matrix indicator of the first link, and wherein the quality of service associated with the first data flow is based at least in part on one or more of a priority of data to be transmitted using the first data flow, a minimum data rate associated with the first data flow, a packet delay budget associated with the first data flow, or reliability associated with the first data flow.

20. The apparatus of claim 17, wherein the instructions are further executable by the processor to cause the apparatus to:
   transmit a reference signal to at least the second UE; and
   receive one or more measurement reports from the second UE or one or more other UEs, and wherein the channel quality of the first link is based at least in part on the one or more measurement reports.

* * * * *